United States Patent
Johnson et al.

(10) Patent No.: US 12,053,682 B2
(45) Date of Patent: Aug. 6, 2024

(54) WEDGE GOLF CLUB FITTING SYSTEM AND METHOD

(71) Applicant: Acushnet Company, Fairhaven, MA (US)

(72) Inventors: Gregory D. Johnson, Valley Center, CA (US); Brett C. Porath, Carlsbad, CA (US); Corey Raymond Gerrard, San Marcos, CA (US); Braedon Armstrong, San Marcos, CA (US)

(73) Assignee: Acushnet Company, Fairhaven, MA (US)

( * ) Notice: Subject to any disclaimer, the term of this patent is extended or adjusted under 35 U.S.C. 154(b) by 204 days.

(21) Appl. No.: 17/566,553

(22) Filed: Dec. 30, 2021

(65) Prior Publication Data

US 2023/0211216 A1    Jul. 6, 2023

(51) Int. Cl.
*A63B 60/42*    (2015.01)
*A63B 24/00*    (2006.01)
*A63B 53/04*    (2015.01)
*A63B 71/06*    (2006.01)

(52) U.S. Cl.
CPC .......... *A63B 60/42* (2015.10); *A63B 24/0003* (2013.01); *A63B 53/047* (2013.01); *A63B 71/0622* (2013.01); *A63B 2024/0034* (2013.01); *A63B 2053/0479* (2013.01); *A63B 2220/805* (2013.01); *A63B 2220/89* (2013.01)

(58) Field of Classification Search
CPC ... A63B 60/42; A63B 24/0003; A63B 53/047; A63B 71/0622; A63B 2024/0034; A63B 2053/0479; A63B 2220/805; A63B 2220/89; A63B 69/3605; A63B 69/36; A63B 53/0433; A63B 60/46; A63B 2220/806; G06Q 30/0631; G09B 19/0038
USPC ......................................... 473/278, 407, 409
See application file for complete search history.

(56) References Cited

U.S. PATENT DOCUMENTS

| | | | |
|---|---|---|---|
| 5,441,256 A | 8/1995 | Hackman | |
| 5,478,073 A | 12/1995 | Hackman | |
| 6,375,579 B1 | 4/2002 | Hart | |
| 6,514,081 B1 * | 2/2003 | Mengoli | A63B 69/36 434/428 |
| 7,273,427 B2 * | 9/2007 | Inoue | A63B 24/0021 473/407 |

(Continued)

OTHER PUBLICATIONS

What Vokey Wedges?—Vokey Design Wedge—Team Tileist, https://www.titleist.com.sg/teamtitleist/team-titleist/f/vokey-design-wedges/46297/what-vokey-wedges, Nov. 2, 2019 (Year: 2019).*

(Continued)

*Primary Examiner* — Nini F Legesse
(74) *Attorney, Agent, or Firm* — LEWIS ROCA ROTHGERBER CHRISTIE LLP

(57) ABSTRACT

A system and computer-implemented method for generating a fitting recommendation for a golf club. In an example, the method includes receiving, by a computing device, player input data; receiving, by the computing device from a launch monitor communicatively coupled to the computing device, first swing analytics for at least one golf shot of a first shot type; and based on the player input data and the first swing analytics, generating, by the computing device, the fitting recommendation comprising at least one of a bounce or a grind for the golf club.

21 Claims, 21 Drawing Sheets

(56) References Cited

U.S. PATENT DOCUMENTS

| | | | |
|---|---|---|---|
| 7,578,175 B2 | 8/2009 | Ban | |
| 8,257,191 B2 | 9/2012 | Stites et al. | |
| 8,414,411 B2 | 4/2013 | Stites et al. | |
| 8,784,228 B2 | 7/2014 | Morin et al. | |
| 8,982,216 B2* | 3/2015 | Ishii | H04N 5/262 |
| | | | 348/157 |
| 9,489,494 B2 | 11/2016 | Ripp et al. | |
| 9,514,379 B2* | 12/2016 | Park | G09B 19/0038 |
| 9,744,422 B2 | 8/2017 | Ripp et al. | |
| 10,071,299 B2 | 9/2018 | Ripp et al. | |
| 10,409,363 B1* | 9/2019 | Kudirka | A63F 13/211 |
| 10,543,415 B2 | 1/2020 | Ripp et al. | |
| 11,007,413 B2 | 5/2021 | Golden et al. | |
| 2002/0123386 A1 | 9/2002 | Perlmutter | |
| 2003/0008731 A1* | 1/2003 | Anderson | A63B 60/42 |
| | | | 473/407 |
| 2003/0216191 A1 | 11/2003 | Wright et al. | |
| 2004/0048685 A1 | 3/2004 | Tsunoda | |
| 2006/0052173 A1 | 3/2006 | Telford | |
| 2008/0115582 A1 | 5/2008 | Sato et al. | |
| 2009/0088276 A1* | 4/2009 | Solheim | A63B 24/0003 |
| | | | 473/409 |
| 2009/0131190 A1 | 5/2009 | Kimber | |
| 2009/0326688 A1 | 12/2009 | Thomas et al. | |
| 2010/0216563 A1 | 8/2010 | Stites et al. | |
| 2011/0230273 A1 | 9/2011 | Niegowski | |
| 2012/0050529 A1 | 3/2012 | Bentley | |
| 2012/0277015 A1 | 11/2012 | Boyd et al. | |
| 2012/0277035 A1 | 11/2012 | Ueda et al. | |
| 2012/0316004 A1* | 12/2012 | Shibuya | A63B 24/0006 |
| | | | 473/223 |
| 2013/0165251 A1 | 6/2013 | Jorgensen | |
| 2014/0045604 A1 | 2/2014 | Brunski et al. | |
| 2014/0260636 A1 | 9/2014 | Kammerer et al. | |
| 2014/0357427 A1* | 12/2014 | Ishikawa | H04M 1/72412 |
| | | | 473/407 |
| 2014/0378238 A1* | 12/2014 | Voges | A63B 71/0619 |
| | | | 473/409 |
| 2015/0105183 A1* | 4/2015 | Kamino | A63B 60/42 |
| | | | 473/407 |
| 2015/0367222 A1 | 12/2015 | Ripp et al. | |
| 2016/0184632 A1 | 6/2016 | Ueda et al. | |
| 2016/0332049 A1 | 11/2016 | Stites et al. | |
| 2017/0274256 A1 | 9/2017 | Brekke et al. | |
| 2017/0291064 A1 | 10/2017 | Onuki et al. | |
| 2017/0340936 A1 | 11/2017 | Hanamitsu et al. | |
| 2018/0272186 A1 | 9/2018 | Goel et al. | |
| 2019/0143175 A1* | 5/2019 | Voges | A63B 69/3623 |
| | | | 473/409 |
| 2019/0192950 A1* | 6/2019 | Tuxen | G06T 7/73 |
| 2020/0398138 A1* | 12/2020 | Hendrix | A63F 13/812 |
| 2021/0069548 A1 | 3/2021 | Beach et al. | |

OTHER PUBLICATIONS

Titleist Vokey SM6 Wedges Review, https://www.youtube.com/watch?v=jR9BjUpZlYs, Feb. 24, 2016 (Year: 2016).*

European search report issued in related European Application No. 22214145.9, May 23, 2023, 12 pages.

Wedge Selector Tool | Find the Best Wedges for You | Vokey SM8—Vokey.Com, URL:https://web.archive.org/web/20210615070959/https://www.vokey.com/tools/wedge-selector-tool.aspx, Jun. 15, 2021 [retrieved on May 11, 2023], 1 page.

What Vokey Wedges?—Vokey Design Wedges—Team Titleist, URL:https://www.titleist.eom.sg/teamtitleist/team-titleist/f/vokey-design-wedges/46297/what-vokey-wedges, Nov. 2, 2019 [retrieved on May 12, 2023], 3 pages.

European Search Report for EP Application No. 23 21 9435, dated May 8, 2024 (17 pages).

* cited by examiner

What is the loft of your PW?
- 43°
- 44°
- 45°
- 46°
- 47°
- 48°
- Don't Know

What is the highest loft you would like to play?
- 56°
- 58°
- 60°
- 62°
- Don't Know

What is your handicap?
- +5-0
- 1-5
- 6-10
- 11-15
- 15-20
- 20-25
- 25-30
- 30+

What is your confidence out of the bunker?
- Low
- Less
- Medium
- More
- High

Bunker conditions?
- Firm
- Slightly Firm
- Medium
- Slightly Soft
- Soft

What are your typical course conditions?
- Firm
- Slightly Firm
- Medium
- Slightly Soft
- Soft

FIG. 10

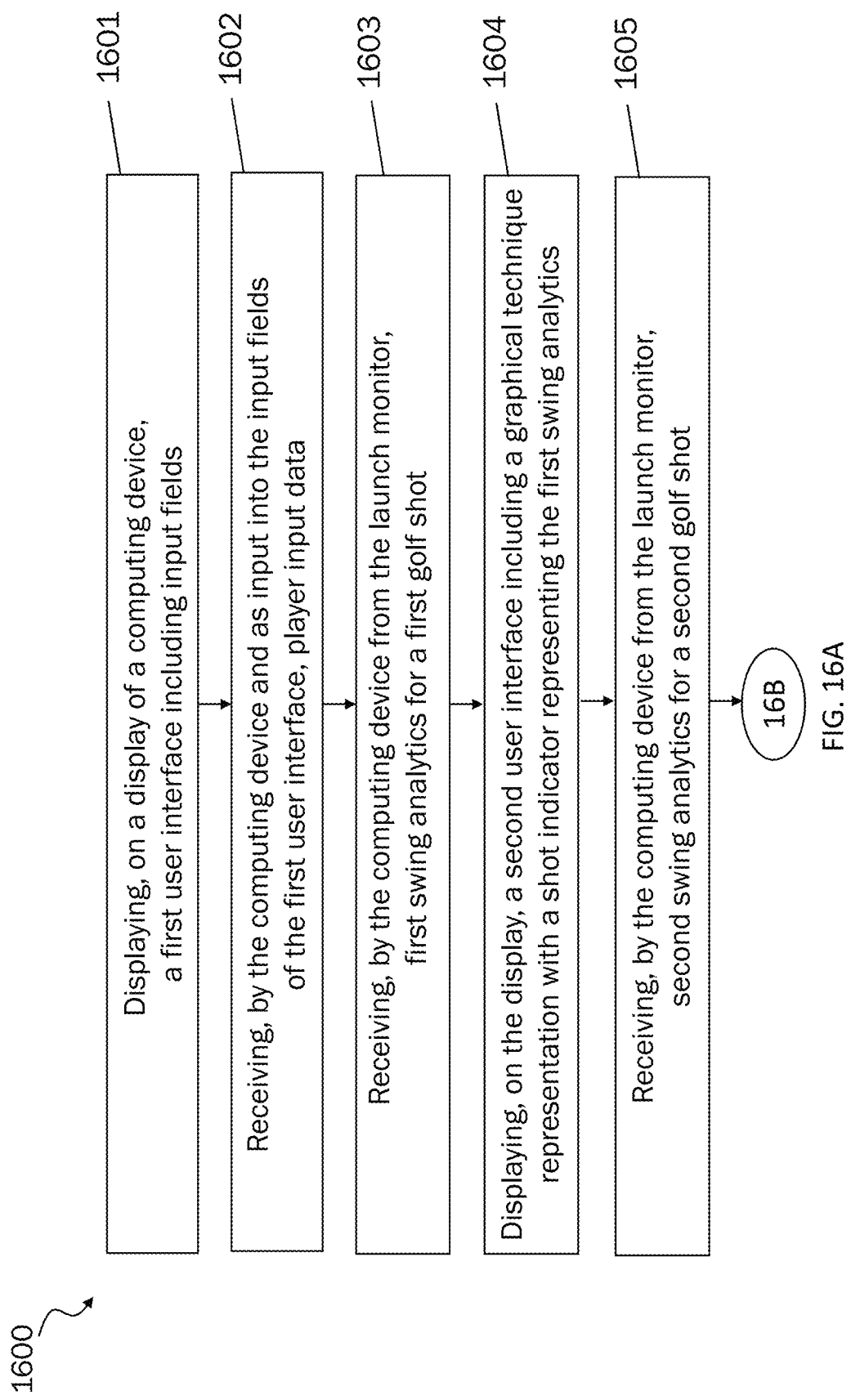

WEDGE GOLF CLUB FITTING SYSTEM AND METHOD

BACKGROUND

A golf club includes a golf club head having a sole. The sole of a wedge type iron golf club can have various bounce angles and various types of grind, which, if appropriately fit, may improve or enhance a golfer's game. However, a typical golfer requires assistance to make this selection, and the current wedge fitting process is generally in an outdoor setting with a lot of dependency on shot trajectory and turf interaction. Because of this heavy dependency on the variables that are traditionally only available in an outdoor setting, there has not been a great way to conduct wedge fitting in an indoor setting, such as a golf equipment store.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe a system and a method for generating a fitting recommendation for a golf club. In an aspect, the technology relates to a computer-implemented method for generating a fitting recommendation for a golf club, the method including: receiving, by a computing device, player input data; receiving, by the computing device from a launch monitor communicatively coupled to the computing device, first swing analytics for at least one golf shot of a first shot type; and based on the player input data and the first swing analytics, generating, by the computing device, the fitting recommendation including at least one of a bounce or a grind for the golf club.

In an example, the first shot type is one of a full swing, a greenside, or an open-face shot. In another example, the generating the fitting recommendation includes generating a plurality of potential bounces for the golf club and ranking the plurality of potential bounces. In another example, the method further includes receiving, by the computing device from the launch monitor, second swing analytics for at least one golf shot of a second shot type, wherein the fitting recommendation is based on both the first swing analytics and the second swing analytics. In another example, the player input data includes at least one of fairway conditions, bunker conditions, player handicap, player pitching wedge loft, player highest preferred loft, or player bunker confidence. In another example, the first swing analytics includes at least one of an attack angle or a shaft lean. In another example, the fitting recommendation includes both the bounce and the grind for the golf club.

In an aspect, the technology relates to a computer-implemented method for generating a fitting recommendation for a golf club, the method including: displaying, by a computing device, a first user interface including input fields; receiving, as input into the input fields of the first user interface, player input data; receiving, by the computing device from a launch monitor communicatively coupled to the computing device, first swing analytics for a first golf shot; displaying, by the computing device, a second user interface including a graphical technique representation with a shot indicator representing the first swing analytics of the first golf shot; generating, by the computing device, the fitting recommendation based on the player input data and the first swing analytics, the fitting recommendation including at least one of a bounce or a grind for the golf club; and displaying, by the computing device, the fitting recommendation.

In an example, the method further includes: receiving, by the computing device from the launch monitor, second swing analytics for a second golf shot, the second swing analytics including at least one of an attack angle or a shaft lean; and updating the shot indicator based on the second swing analytics. In another example, the method further includes receiving, by the computing device from the launch monitor, second swing analytics for a second golf shot, the second swing analytics including at least one of an attack angle or a shaft lean, wherein the fitting recommendation is further based on the second swing analytics. In another example, the method further includes: generating, by the computing device and based on the player input data, a golf shot prompt including a plurality of golf clubs, a corresponding loft of each golf club of the plurality of golf clubs, and at least one shot type for each golf club of the plurality of golf clubs, and receiving, by the computing device from the launch monitor, swing analytics for a plurality of golf shots based on the golf shot prompt, the swing analytics including at least one of an attack angle or a shaft lean for each golf shot of the plurality of golf shots. In another example, the second user interface further includes a fitting recommendation representation to display a loft of the golf club and a recommended bounce of the fitting recommendation for the golf club. In another example, the generating the fitting recommendation includes generating a plurality of potential bounces for the golf club and ranking the plurality of potential bounces. In an example, the second user interface includes a selectable user interface element, and the method further includes: receiving a selection of the selectable user interface element; and in response to receiving the selection, displaying a third user interface including a loft of the golf club and the plurality of potential bounces for the golf club. In another example, the first swing analytics includes at least one of an attack angle or a shaft lean, wherein the graphical technique representation includes a technique graph having a first axis corresponding to the attack angle and a second axis corresponding to the shaft lean, and the shot indicator is displayed in the technique graph. In an example, the first golf shot is of a first shot type, and wherein the method further includes: receiving, by the computing device from the launch monitor, second swing analytics for a second golf shot of the first shot type, the second swing analytics including at least one of an attack angle or a shaft lean; and based on the second swing analytics of the second golf shot, updating the shot indicator by moving the shot indicator to a point in the technique graph having an attack angle corresponding to an average of the attack angles of the first and second golf shots and having a shaft lean corresponding to an average of the shaft leans of the first and second golf shots. In an example, the shot indicator includes a geometric shape, and updating the shot indicator includes decreasing a size of the geometric shape.

In an aspect, the technology relates to a system for generating a fitting recommendation for a golf club, the system including: a launch monitor including one or more sensors configured to capture at least one of swing analytics or ball flight characteristics; a computing device communicatively coupled to the launch monitor, the computing device including: a display; a processor; and memory storing instructions that, when executed by the processor, cause the system to perform operations including: receiving, by the computing device from the launch monitor, first swing analytics for a first golf shot, displaying, on the display, a shot-analysis user interface including a graphical technique representation representing the first swing analytics of the first golf shot, and generating the fitting recommendation based on at least one of the first or second swing analytics, the fitting recommendation including at least one of a bounce or a grind for the golf club.

In an example, the first swing analytics includes at least one of an attack angle or a shaft lean, and the graphical technique representation includes: a technique graph having a first axis corresponding to the attack angle and a second axis corresponding to the shaft lean, and a shot indicator in the technique graph representing, in response to the computing device receiving the first swing analytics, the attack angle and the shaft lean of the first golf shot. In another example, the operations further include: receiving, by the computing device from the launch monitor, second swing analytics for a second golf shot, the second swing analytics including at least one of an attack angle or a shaft lean, and updating, in response to receiving the second swing analytics, a position of the shot indicator in the technique graph. In another example, the operations further include: displaying, on the display, a data-input user interface including input fields; and receiving, as input into the input fields of the data-input user interface, player input data, wherein the generating the fitting recommendation is further based on the player input data.

BRIEF DESCRIPTION OF THE DRAWINGS

Non-limiting and non-exhaustive examples are described with reference to the following figures.

FIG. 10 depicts a first user interface according to an example.

FIGS. 16A and 16B depict an example method for generating a fitting recommendation for a golf club.

DETAILED DESCRIPTION

The present disclosure is directed to a system and method of fitting golf clubs. In some examples, the systems and methods herein are for fitting wedge type iron golf clubs having lofts within the range of 46° to 64°, examples of which are shown in FIGS. 1-4 and discussed with reference to Table 1 below.

Figure 1:
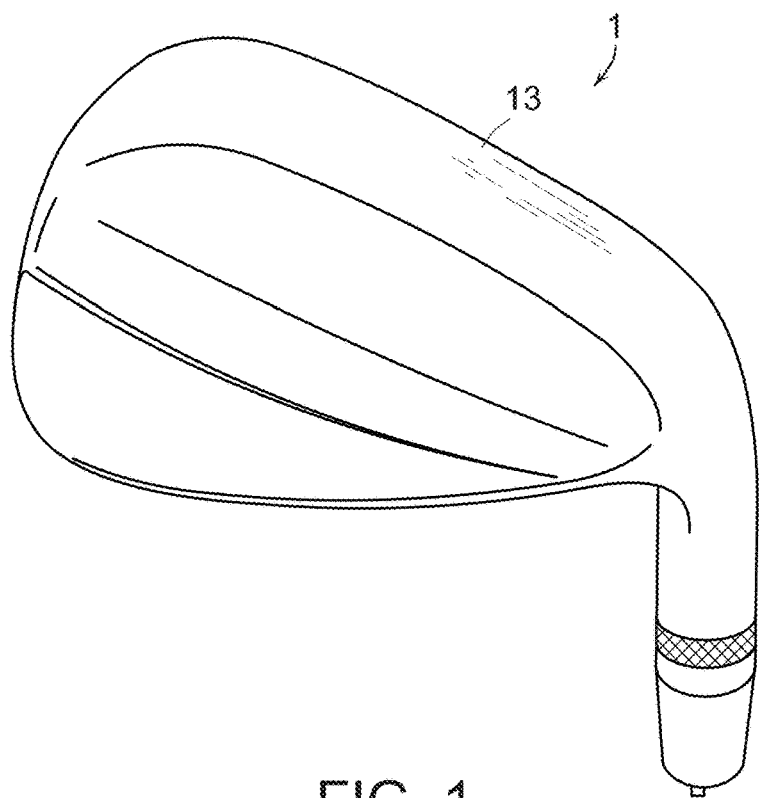
FIG. 1 depicts a gap wedge golf club head.
Figure 2:
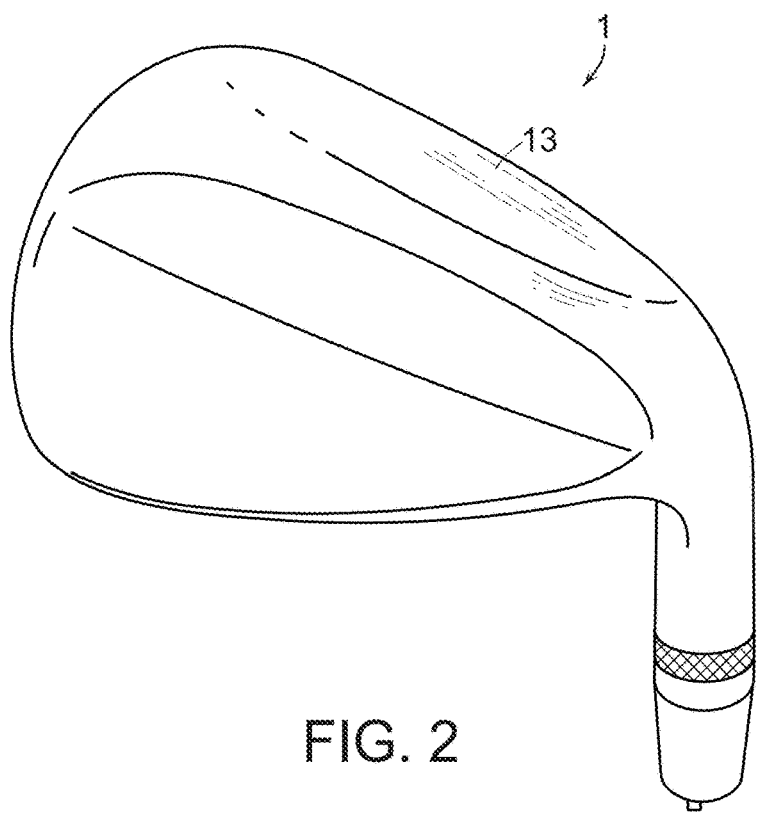
FIG. 2 depicts a sand wedge golf club head.
Figure 3:
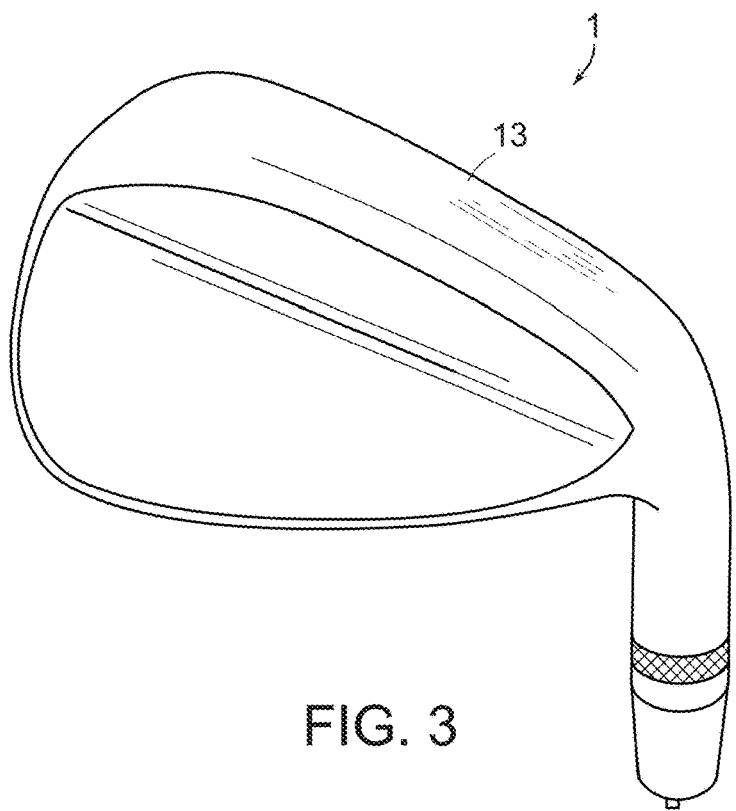
FIG. 3 depicts a sand wedge golf club head.
Figure 4:
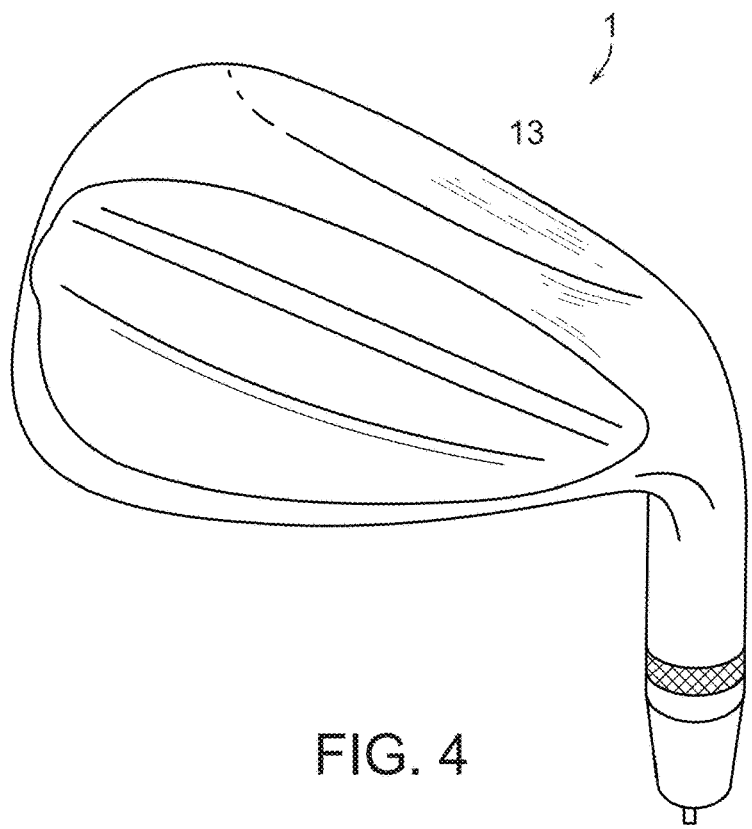
FIG. 4 depicts a lob wedge golf club head.

FIG. 1 depicts a gap wedge golf club head 1 having a 50 degree loft and a sole 13 having an 8 degree bounce and an F-grind. FIG. 2 depicts a sand wedge golf club head 1 having a 54 degree loft and a sole 13 having an 8 degree bounce and an M-grind. FIG. 3 depicts a sand wedge golf club head 1 having a 56 degree loft and a sole 13 having a 10 degree bounce and an S-grind. FIG. 4 depicts a lob wedge golf club head 1 having a 58 degree loft and a sole 13 having a 12 degree bounce and a D-grind.

Figure 5:
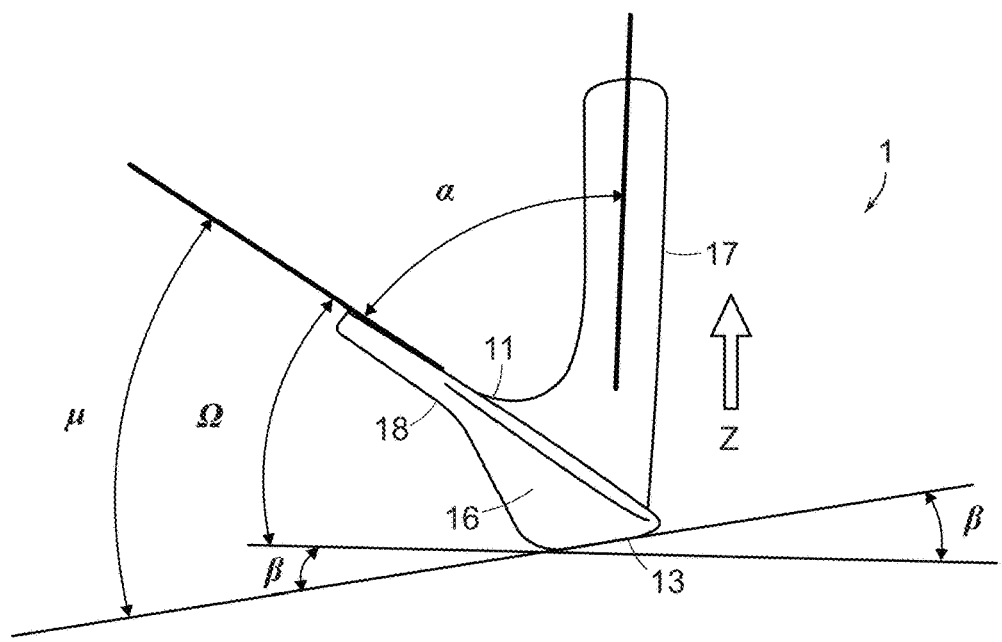
FIG. 5 depicts a view of an iron type golf club head 1 in a toe-to-heel direction with the golf club head 1 in a standard address position.
Figure 6:
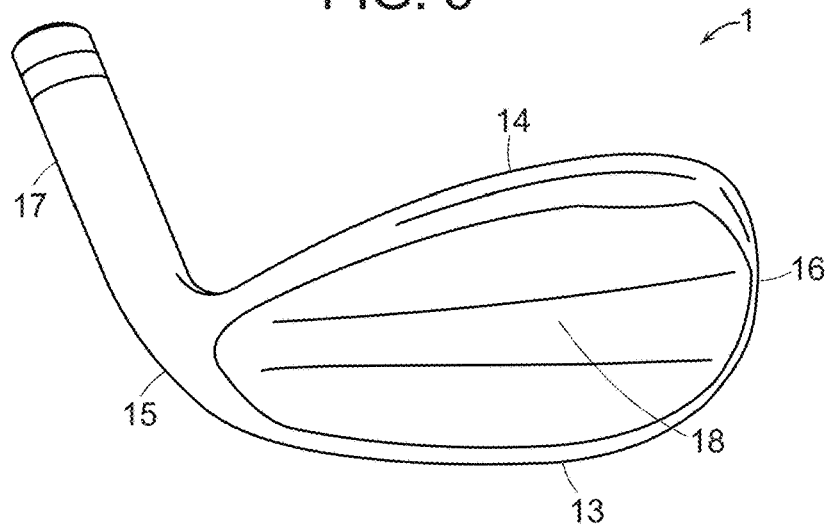
FIG. 6 depicts a back view of the golf club head 1 of FIG. 5.
Figure 7:
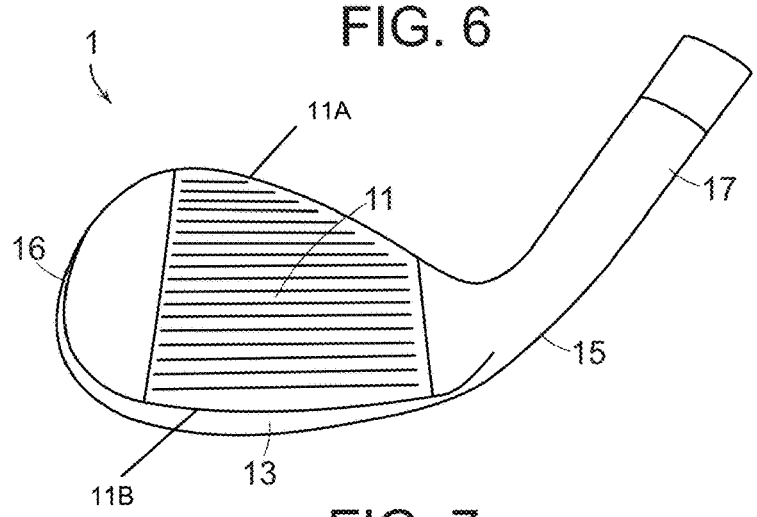
FIG. 7 depicts a forward view of the golf club head 1 of FIG. 5.

FIG. 5 depicts a view of an iron type golf club head 1 in a toe-to-heel direction with the golf club head 1 in a standard address position. FIG. 6 depicts a back view of the golf club head 1 of FIG. 5. FIG. 7 depicts a forward view of the golf club head 1 of FIG. 5. Referring to FIGS. 5-7, the golf club head 1 includes a body having a striking face 11 on a forward portion of the body, a back surface 18 opposite to the strike face 11, a heel side 15, and a toe side 16 opposite to the heel side 15. Each of the striking face 11 and the back surface 18 are at least partially coupled between the heel side 15 and the toe side 16. A hosel 17 is disposed at the heel end 15 of the body and is configured to couple to a golf club shaft (not shown).

The striking face 11 of the golf club head 1 is configured for striking a golf ball. Grooves are machined into the striking face 11 and extend along a toe-heel direction. The grooves may be radiused at a toe side of the grooves and at a heel side of the grooves. A round cutter or a saw cutter, may be used to form the grooves such that the toe and heel sides of the grooves are radiused about an axis of rotation that is perpendicular to a longitudinal axis of the groove. Having radiused groove sides facilitates removal of dirt, grass, sand, and other materials that typically become embedded within the grooves of a golf club during normal use by eliminating corners that can trap these materials. Details about grooves and groove manufacture can be found in more detail in U.S. Pat. No. 7,758,449 to Gilbert, et al., the entire content of which is hereby incorporated by reference. Any definitions, terminology, or characterizations of the present disclosure used herein shall take precedence over any conflicting information provided in any material incorporated by reference.

The striking face 11 has an upper topline edge 11A and a lower leading edge 11B opposite to the upper topline edge 11A. The upper topline edge 11A and the lower leading edge 11B are each coupled between the heel side 15 and the toe side 16. The body includes a top portion 14 coupled between the upper topline edge 11A of the striking face 11 and the back surface 18. The body further includes a sole 13 extending from the lower leading edge 11B of the striking face 11 to the back surface 18. The top portion 14 and the sole 13 are each coupled between the heel side 15 and the toe side 16 of the body. The sole 13 may have one of a plurality of combinations of bounce angle and type of grind. The bounce angle may be between about −5 degrees to about 20 degrees. Examples of some available combinations for a wedge type golf club head are set forth in Table 1.

TABLE 1

| Wedge Type | Loft (α) | Bounce Angle (β) | Sole Configuration |
| --- | --- | --- | --- |
| Pitching | 46 | 10 | F |
| Pitching | 48 | 10 | F |
| Gap | 50 | 8 | F |
| Gap | 50 | 12 | F |
| Gap | 52 | 8 | F |
| Gap | 52 | 12 | F |
| Sand | 54 | 8 | M |
| Sand | 54 | 10 | S |
| Sand | 54 | 14 | F |
| Sand | 56 | 8 | M |
| Sand | 56 | 10 | S |
| Sand | 56 | 14 | F |
| Lob | 58 | 4 | L |
| Lob | 58 | 8 | M |
| Lob | 58 | 10 | S |
| Lob | 58 | 12 | D |
| Lob | 58 | 14 | K |
| Lob | 60 | 4 | L |
| Lob | 60 | 8 | M |
| Lob | 60 | 10 | S |
| Lob | 60 | 12 | D |
| Lob | 60 | 14 | K |
| Lob | 62 | 8 | M |

A loft α of a wedge, as shown in FIG. 5, generally determines a launch angle of a golf ball when hit with the wedge, and thus, at least partially determines a distance the golf ball will travel after being hit. For example, a wedge having a loft of 46 degrees will hit the golf ball with a lower launch angle than a wedge having a 60 degree loft. A full shot with a wedge having a loft of 46 degrees will also typically go further than with a wedge having a 60 degree loft.

Golfers may use a plurality of wedges for their golf game. Pitching and gap wedges are often used for full shots into a green and more of a bump-and-run type pitch shot around the green. Sand wedges are typically more versatile and used to hit the ball out of sand traps as well as for higher loft shots around the green. Lob wedges are generally used for shorter shots where the player requires a shot with very little run after the ball lands on the green.

Because wedges generally have multiple purposes and players use them differently, there are many options for wedges, including a configuration (or grind type) of the sole. For example, an F-grind sole configuration, as shown in FIG. 1, is a relatively planar sole having a small camber radius from front-to-back and from heel-to-toe. The F-grind sole is an all-purpose grind that is particularly suited for full shots and shots hit with a square face. The F-grind is generally preferred by players that desire a traditional wedge sole.

An M-grind sole configuration, as shown in FIG. 2, has a relatively planar front portion surface that is crescent-shaped with large relief surface across the back, heel and toe portions of the sole. The M-grind is generally better for players with a shallower, more sweeping swing that play shots from a variety of clubface positions.

An S-grind sole configuration, as shown in FIG. 3, has a small camber radius from front-to-back and from heel-to-toe with some relief surface across the back portion of the sole. The S-grind sole is generally best for square faced shots like the F-grind, but has more versatility than the F-grind.

A D-grind sole configuration, as shown in FIG. 4, has a relatively planar front portion surface that is crescent-shaped and a large bounce angle with large relief surface across the back, heel and toe portions of the sole. The D-grind is generally preferred by players that have a steeper delivery to the ball because of the wedge's higher bounce. The D-grind is similar to the M-grind in that they have a crescent-shaped front portion of the sole, but the D-grind offers more bounce in the forward portion.

A K-grind sole configuration is a high bounce wedge sole with a large camber radius from front-to-back and from heel-to-toe. The sole configuration is particularly useful for bunker shots. The K-grind is a wide, full sole wedge with enhanced camber to make it forgiving from a variety of sand and turf conditions.

An L-grind sole configuration features a narrow crescent shape front portion with steep relief surfaces along the back and at the heel and toe, allowing for maximum greenside versatility. The sole configuration is ideal for firm conditions and designed for skilled players who frequently open or close the clubface to create different types of shots around the green.

A bounce angle β is the angle the sole creates with a planar ground surface when the hosel is in the vertical plane, a standard address position, as shown in FIG. 5. The bounce angle β can also be measured by measuring a Face-to-Sole angle µ and subtracting the Face-to-Ground angle Ω (which is equivalent to 90°−α) when the wedge is in the standard address position. Some wedges have a sole defined by a cambered surface from front-to-back. With these soles, the bounce angle β can be determined from the tangent line of the curved surface half way between the leading edge and the trailing edge.

Figure 8:
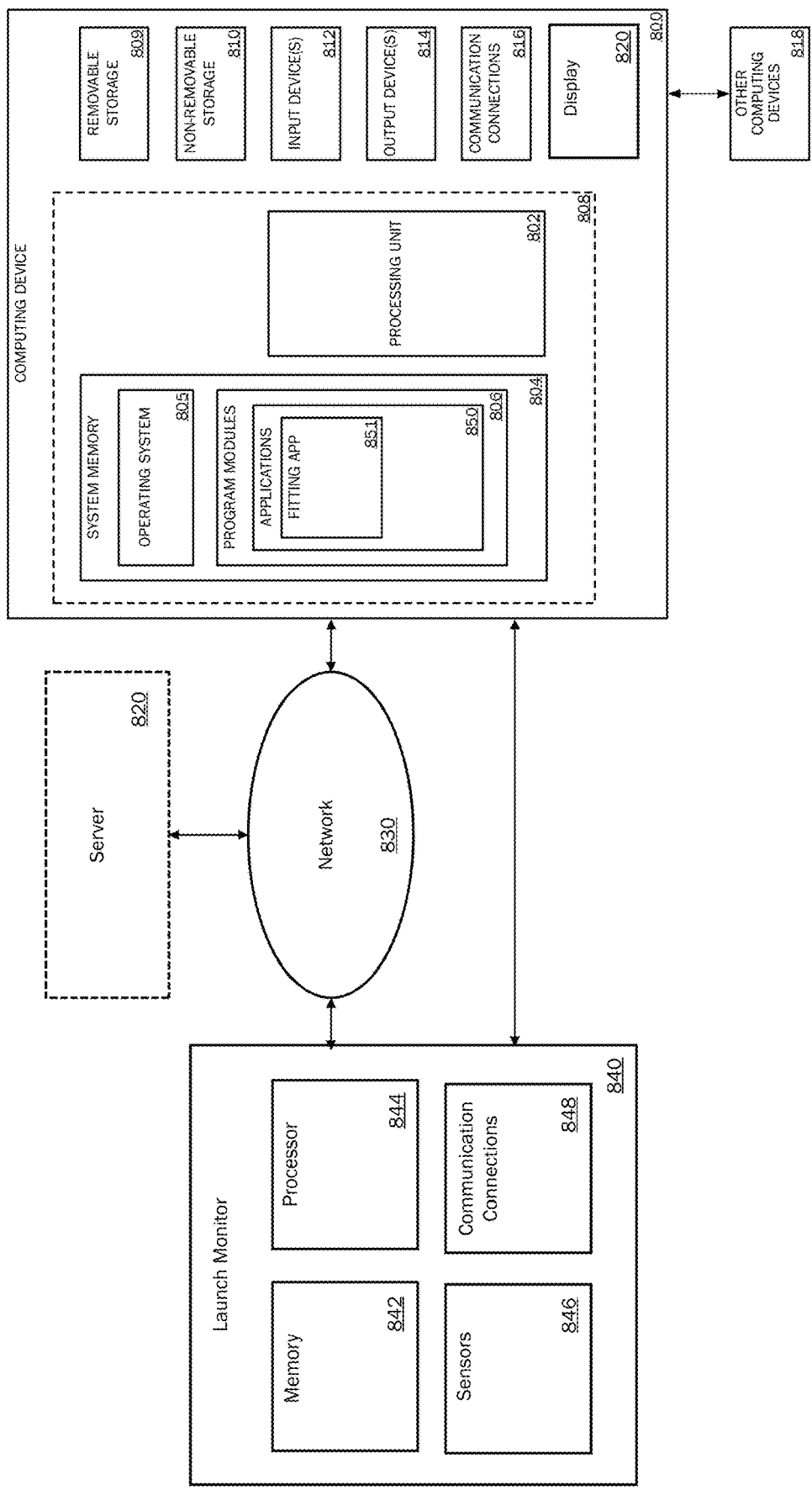
FIG. 8 depicts a block diagram illustrating components of a system for generating a fitting recommendation for a golf club according to an example

FIG. 8 depicts a block diagram illustrating components (e.g., hardware and software) of a system used to generate a fitting recommendation for a golf club according to an example. The system includes a computing device 800 communicatively coupled to a launch monitor 840. The launch monitor 840 may be communicatively coupled to the computing device 800 via a network 830, a wired connection, or a wireless connection, such as a Bluetooth connection. In some embodiments, the launch monitor 840 and the computing device 800 may be integrated as a single device. The launch monitor 840 and/or the computing device 800 may be communicatively coupled to a server 820, for example, via the network 830.

The launch monitor 840 may be used to measure swing analytics and/or ball flight characteristics of a golf club shot and to communicate the measurements to the computing device 800. The launch monitor 840 includes at least one sensor 846 configured to measure the swing analytics and/or ball flight characteristics. For instance, the sensor(s) 846 may include optical sensors that optically track the golf club as it is being swung by the golfer. Radar components may also be utilized as sensors 846 to track at least one of the golf club during the swing or the golf ball flight after it is struck by the golf club. The swing analytics for the golf club may include at least attack angle and/or shaft lean. The ball flight characteristics may include at least carry distance and/or spin of a golf ball.

The launch monitor 840 also includes a memory 842, processor 844, and communication connections 848. The processor 844 is configured to control operations of the launch monitor 840. The memory 842 is configured to store, for example, measurements taken by the at least one sensor 846 and software used by the processor 844 to control the operations of the launch monitor 840. For instance, the memory 842 may store operations that when executed by the processor 844 cause the launch monitor 840 to perform the operations described herein. The communication connections 848 are configured to communicate with the network 830 and/or the computing device 800 in any manner described herein. Accordingly, the launch monitor 840 is configured to measure swing analytics and/or ball flight characteristics of a golf club shot using the at least one sensor 846, store the measurements in the memory 842, and communicate the measurements to the computing device 800 by the communication connections 848.

The computing device 800 may be any computing device suitable to be used in the system for generating a fitting recommendation for a golf club as described herein. In some examples, the computing device 800 is a desktop computer, a portable computer, a mobile phone, a tablet, etc.

In a basic configuration, the computing device 800 may include at least one processing unit 802 (e.g., processor) and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 850 such as fitting recommendation applications 851. The fitting recommendation application 851 may include instructions that, when executed by the processing unit 802, cause the system to perform operations described herein for generating a fitting recommendation for a golf club. The operating system 805, for example, may be suitable for controlling the operation of the computing device 800. Furthermore, aspects of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including, but not limited to, one or more of the stages or operations of the methods described herein. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a computer or in any other circuits or systems.

The computing device 800 may also have one or more input device(s) 812 such as a keyboard, a mouse, a pen, a sound input device, a touch input device, etc. The computing device 800 includes a display 820 and may also include other output device(s) 814 such as speakers, a printer, etc. The aforementioned devices are examples and others may be used. The computing device 800 may include one or more communication connections 816 allowing communications with other computing devices 818 and/or with the launch monitor 840. For example, the computing device 800 and launch monitor 840 may communicate with each other via the communication connections 816 of the computing device 800 and the communication connections 848 of the launch monitor. Examples of suitable communication connections 816 and 848 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Methods for generating a fitting recommendation will now be described with reference to FIGS. 8-16B. The methods may be implemented or performed by the system illustrated and described with reference to FIG. 8. The systems and methods described herein for generating a fitting recommendation may be used indoors or outdoors.

Figure 9:
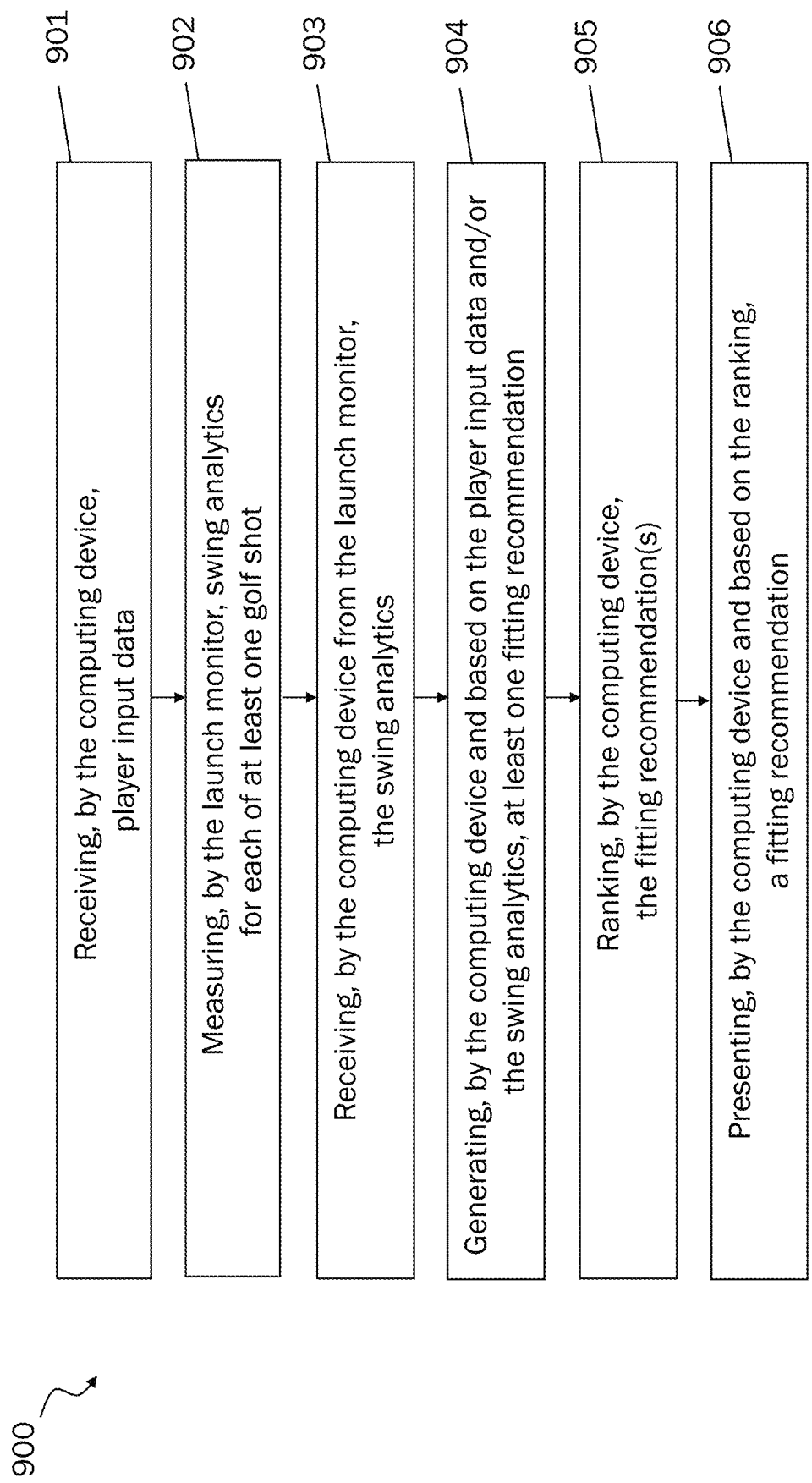
FIG. 9 depicts an example method for generating a fitting recommendation for a golf club.

FIG. 9 depicts operations of a computer-implemented method 900 for generating a fitting recommendation for a golf club according to an example. The fitting recommendation may include a bounce and/or a grind for the golf club and may be generated by the computing device 800 based on a combination of player input data and swing analytics of one or more golf club shots measured by the launch monitor 840 and received by the computing device 800.

At operation 901, player input data is received. For instance, the player input data may be received by the computing device 800. The player input data may include information such as the loft of a player's pitching wedge, what the highest loft the player would like to play at, what the player's handicap is, what the player's confidence is in hitting out of the bunker, what the conditions are of a golf course (e.g., softness or firmness, a grass type, etc. at a golf course that the player intends to play at), and/or what the conditions are of bunkers (e.g., sand softness of firmness, sand type, etc. of the bunkers in the golf course that the player intends to play at). The player input data is not limited to combinations of the above-listed items of information, and other items of information may also be included in the player input data with or without the above-described items of information. The swing analytics may include at least attack angle and/or shaft lean (e.g., only attack angle, only shaft lean, or attack angle and shaft lean), but the present disclosure is not limited thereto.

At operation 902, when at least one golf shot is hit, swing analytics for each of the at least one golf shot are measured by the launch monitor 840. The golf shots are hit by a player and may be hit with a plurality of different golf clubs having the same or different lofts. The golf shots may be of the same or different shot types, such as a full swing shot, a pitch, a partial swing shot (e.g., a shot between a full swing shot and a pitch), a chip, a greenside shot (e.g., an about 20 yard pitch shot), a bunker shot, and/or an open-face shot.

At operation 903, the measured swing analytics are received. For instance, the measured swing analytics may be received by the computing device 800 from the launch monitor 840.

At operation 904, at least one fitting recommendation is generated based on the received swing analytics and/or the player input data. The fitting recommendation(s) may be generated by the computing device 800. Each fitting recommendation may include a bounce and/or grind of a golf club having a particular loft. For example, the computing device 800 may generate, for a golf club having a 56 degree loft, a first fitting recommendation including a 10 degree bounce and an S-grind sole, a second fitting recommendation having an 8 degree bounce and an M-grind sole, and a third fitting recommendation including a 12 degree bounce and a D-grind sole.

At operation 905, the computing device 800 ranks, based on the player input data and/or the swing analytics, the fitting recommendation(s), generated in operation 904, from most recommended to least recommended. For example, of the first to third fitting recommendations for the 56 degree loft described above, the computing device 800 may rank the first recommendation as the most recommended, the third recommendation as the least recommended, and the second recommendation between the first and third fitting recommendations.

At operation 906, a fitting recommendation is presented. For instance, the computing device 800 may present the fitting recommendation on the display 820. The presented fitting recommendation may be based on the ranking performed in operation 904. For example, among the first to third fitting recommendations for the 56 degree loft described above, the computing device 800 may provide as its ultimate fitting recommendation the first fitting recommendation, which it ranked as the most recommended. In other examples, more than one fitting recommendation may be presented, and the fitting recommendations may be presented in their ranked order.

The method 900 described with reference to FIG. 9 is a non-limiting example, and the present disclosure is not limited thereto. For example, although operation 901 is described as occurring before operation 902, the present disclosure is not limited thereto, and the chronological order of these operations may be reversed in some examples. That is, the at least one golf shot may be hit, and the launch monitor 840 may measure swing analytics of the at least one golf shot, prior to receiving the player input data. Also, although operations 904 and 905 are described as separate operations in the example of FIG. 9, these operations may occur concurrently or simultaneously, for example, as a single operation.

Figure 11:
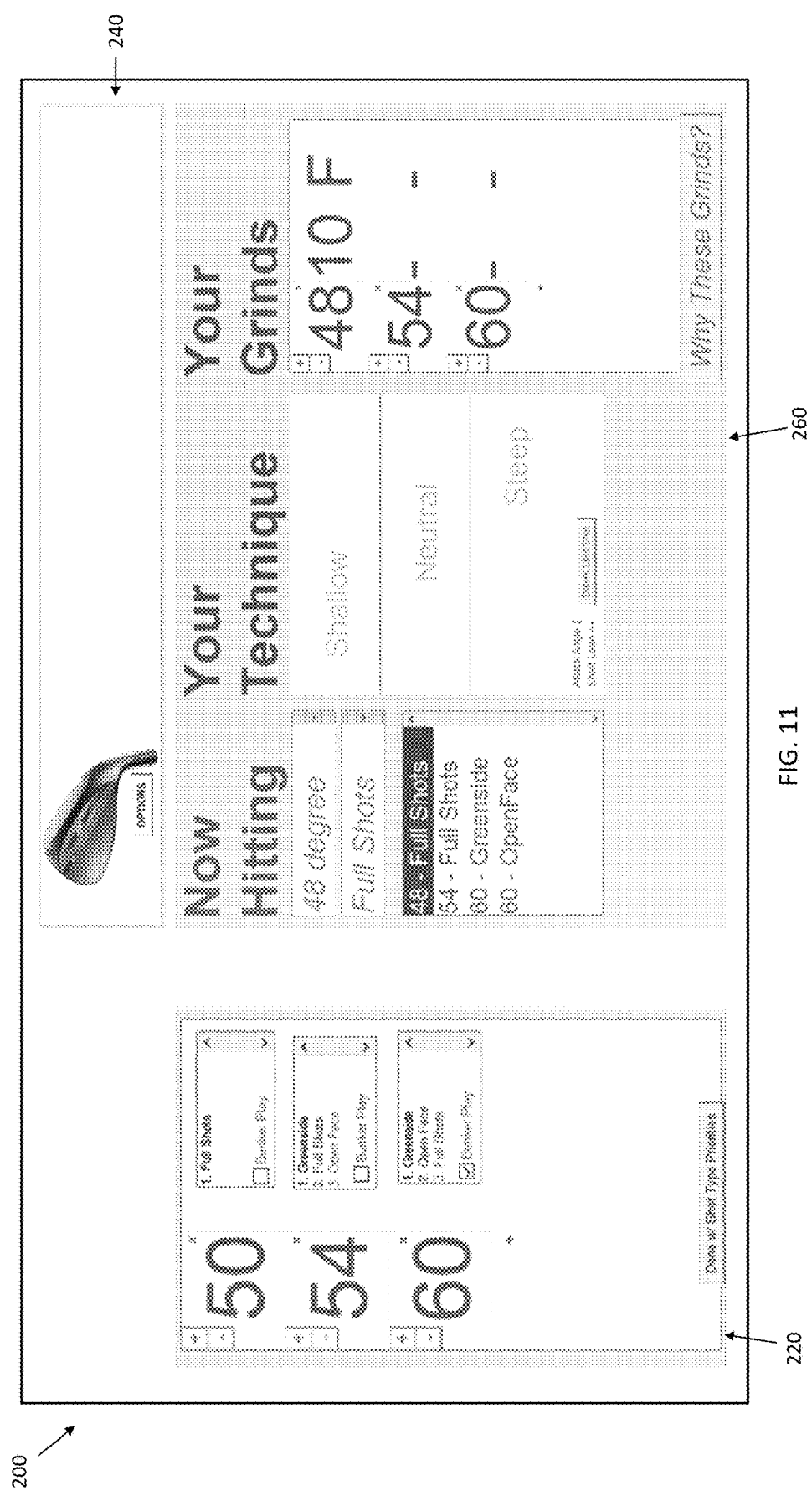
FIG. 11 depicts a second user interface according to an example.
Figure 12:
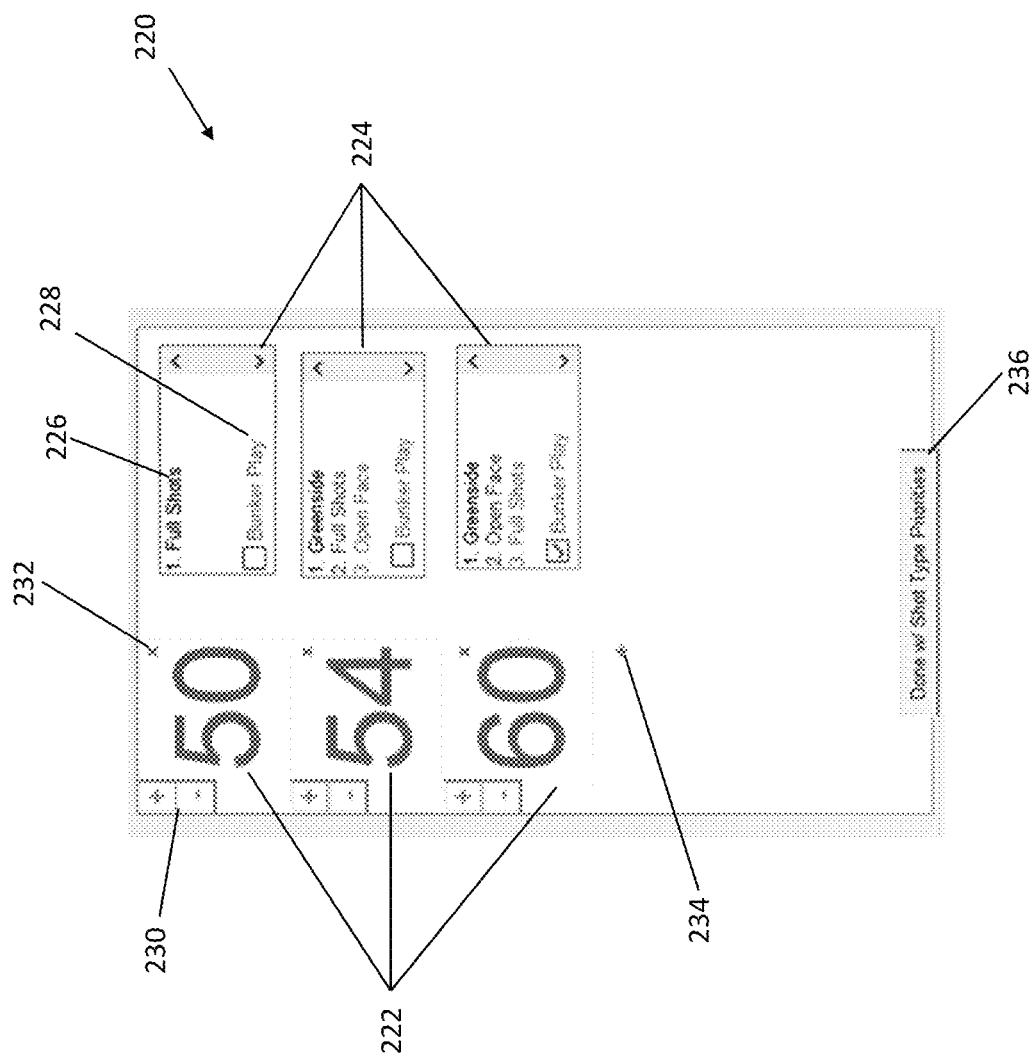
FIG. 12 depicts a golf shot prompt of the second user interface of FIG. 11.
Figure 14:
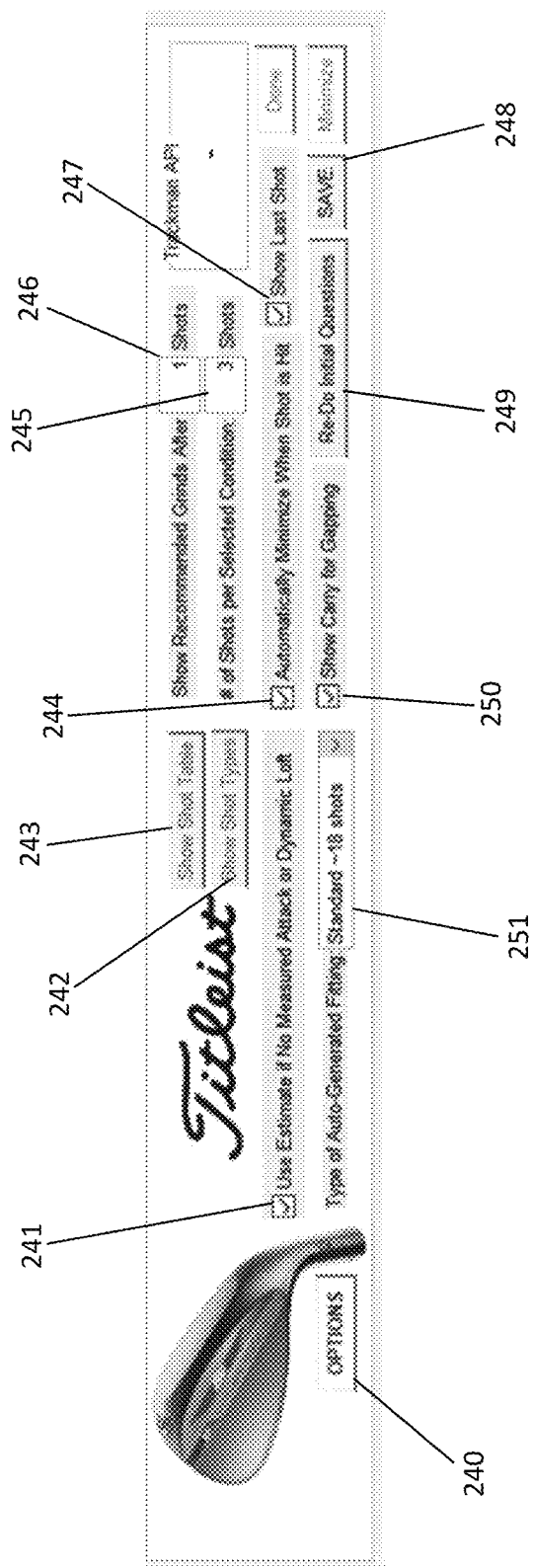
FIG. 14 depicts a top portion of the golf shot analysis segment of FIGS. 13A-13E when a plurality of options are displayed.
Figure 15:
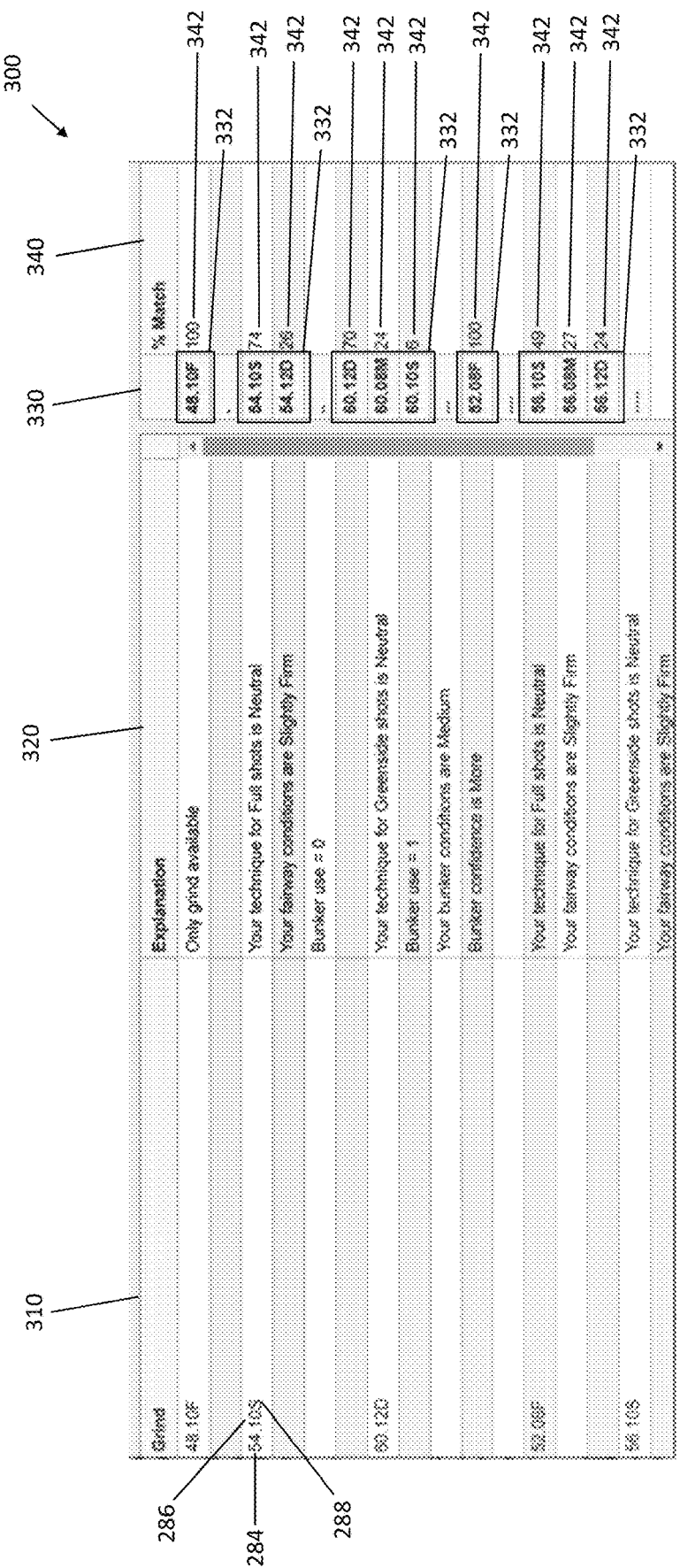
FIG. 15 depicts a third user interface according to an example.

Additional details about fitting recommendations according to examples of the present disclosure will be described with reference to the first, second, and third user interfaces illustrated and described with reference to FIGS. 10-15. FIG. 10 depicts a first user interface according to an example. FIG. 11 depicts a second user interface according to an example. FIG. 12 depicts a golf shot prompt of the second user interface of FIG. 11. FIGS. 13A-13E depict a golf shot analysis segment of the second user interface of FIG. 11 at different stages of hitting golf shots. FIG. 14 depicts a top portion of the golf shot analysis segment of FIGS. 13A-13E when a plurality of options are displayed. FIG. 15 depicts a third user interface according to an example. As described herein, controllable features of the first, second, and third user interfaces 100, 200, and 300, may be controlled by any suitable means, such as input devices including a keyboard, a mouse, a pen, a sound input device, and/or a touch input device (e.g., touchscreen), etc. The controllable features of the first, second, and third user interfaces 100, 200, and 300 may be controlled, for example, by a golfer or a professional fitter using the system to obtain a fitting recommendation for the golfer.

Referring to FIG. 10, first user interface 100 may be used to receive, by the computing device 800, player input data. The first user interface 100 may include one or more input fields, and the computing device 800 is configured to receive the player input data as input into the one or more input fields of the first user interface 100. The input fields include a first input field 101 for receiving information about a player's pitching wedge loft, a second input field 102 for receiving information about a highest loft that the player would like to play, a third input field 103 for receiving the player's handicap, a fourth input field 104 for receiving information about the player's confidence in hitting out of a bunker, a fifth input field 105 for receiving information about bunker conditions in one or more course (e.g., typical bunker conditions) that the player intends to play, and a sixth input field 106 for receiving information about conditions for one or more courses or fairways (e.g., typical course conditions) that the player intends to play.

Each of the input fields 101-106 may include different selectable values for the user to provide the player input data, as shown in the example first user interface 100 of FIG. 10. For instance, for the first input field 101, a selection of any of the 43, 44, 45, 46, 47, 48, or "Don't Know" selectable options results in the corresponding player input data being received and stored by the system. In other examples, the input fields 101-106 may include an input box that can receive freeform text or numbers to provide the player input data.

In some examples, the first user interface 100 is configured so that the input fields of the first user interface 100 are all displayed simultaneously on the display 820. In other examples, the first user interface 100 is configured so that the input fields of the first user interface 100 are sequentially displayed. For example, the first user interface 100 may be configured so that the first input field 101 is displayed and, after input is received into the first input field 101, the second input field 102 is displayed and, after input is received into the second input field 102, the third input field 103 is displayed, etc.

In some examples, the first user interface 100 is configured to allow selection of one or more of the input fields to be displayed on the display 820. For example, the first user interface 100 may display a plurality of selectable tabs corresponding to the input fields of the first user interface 100, and the first user interface 100 may be configured, upon the computing device 800 receiving selection of one of the selectable tabs, to display the input field corresponding to the selected tab. Accordingly, a person entering the player input data may select and enter input into the input fields of the first user interface 100 in any desired order, and the person may be able to return to an input field that previously received input and input new information into that input field.

Referring to FIG. 11, the second user interface 200 includes a golf shot prompt 220 and a golf shot analysis segment 260. The second user interface 200 may be displayed while at least one golf shot is hit and swing analytics thereof are measured by the launch monitor 840.

Referring to FIG. 12, the golf shot prompt 220 allows for the golf shots that are to be hit to be defined. The golf shot prompt 220 includes one or more lofts 222 for different golf clubs to be hit and a corresponding shot type control menu 224 for each of the lofts 222. The lofts 222 may define which lofts are to be used when hitting the golf shots. Each of the shot type control menus 224 includes a list of one or more shot types 226 and a selectable bunker play option 228.

The shot types 226 included in each of the shot type control menus 224 may identify what type the golf shots may be used when hitting golf shots with the corresponding loft 222. In some examples, shot type control menu 224 is configured to be controlled to add or delete shot types 226, or to rearrange a priority of the shot types 226. The shot types 226 may be prioritized, for example, according to a player's most preferred to least preferred type of shot used with the corresponding loft 222. The bunker play option 228 is selectable to indicate that the corresponding loft may be, or is intended to be, used for bunker shots. Upon receiving a selection of the bunker play option 228 by the computing device 800, the bunker play option 228 may display a checked box. Upon receiving a deselection of the bunker play option 228 by the computing device 800, the bunker play option 228 may display an unchecked box.

A corresponding loft control 230 is included in the golf shot prompt 220 for each of the lofts 222 and is configured to be controllable or changeable to adjust the value of the corresponding loft 222. For example, the loft control 230 may include two selectable elements: one labeled with a "+" symbol and configured to increase the displayed loft 222 upon the computing device 800 receiving a selection of the + element, and another one labeled with a "−" symbol and configured to decrease the displayed loft 222 upon the computing device 800 receiving a selection of the − element.

The golf shot prompt 220 is configured to be controllable or adjustable to remove or add lofts 222. For example, the golf shot prompt 220 includes a selectable removal button 232 for each of the displayed lofts 222 configured, upon the computing device 800 receiving a selection of the removal button 232, to remove the corresponding loft 222. The golf shot prompt 220 also includes a selectable addition button 234 configured, upon the computing device 800 receiving a selection of the addition button 234, to add a golf club with a new loft 222.

Accordingly, the golf shot prompt 220 may be configured so that the number of lofts 222, the value of each of the lofts 222, and the corresponding shot types 226 are controllable or adjustable. However, the golf shot prompt 220 may also be configured to provide an initial recommendation of the lofts 222 and of the corresponding shot types 226. In some examples, the golf shot prompt 220 may provide a standard or default recommendation of lofts 222 and corresponding shot types 226 based on, for example, hierarchical data stored into the computing device 800 or obtained from the server 820. In some other examples, the golf shot prompt 220 may provide a recommendation of the lofts 222 and corresponding shot types 226 based on the player input data. For example, the recommendation may be based on the data input into the first input field 101 (i.e., the loft of the player's pitching wedge) and the second input field 102 (i.e., the highest loft that the player would like to play with). As a non-limiting example, if the data input into the first input field 101 is a pitching wedge loft of 48, and the data input into the second input field 102 is a highest loft of 60, the golf shot prompt 220 may provide an initial gapping recommendation for the lofts 222 of 48, 52, 56, and 60. In some examples, the golf shot prompt 220 is not configured to provide an initial recommendation, but rather initially provides no lofts 222 and allows for addition of lofts through user interaction with the golf shot prompt 220.

The golf shot prompt 220 includes a selectable conclusion button 236, which is labeled "Done w/ Shot Type Priorities" in the example shown in FIG. 12. The conclusion button 236 is configured, upon the computing device 800 receiving selection of the conclusion button 236, to cause the golf shot analysis segment 260 to be displayed. The golf shot prompt 220 may then either cease to be displayed or may continue to be displayed.

Figure 13A:
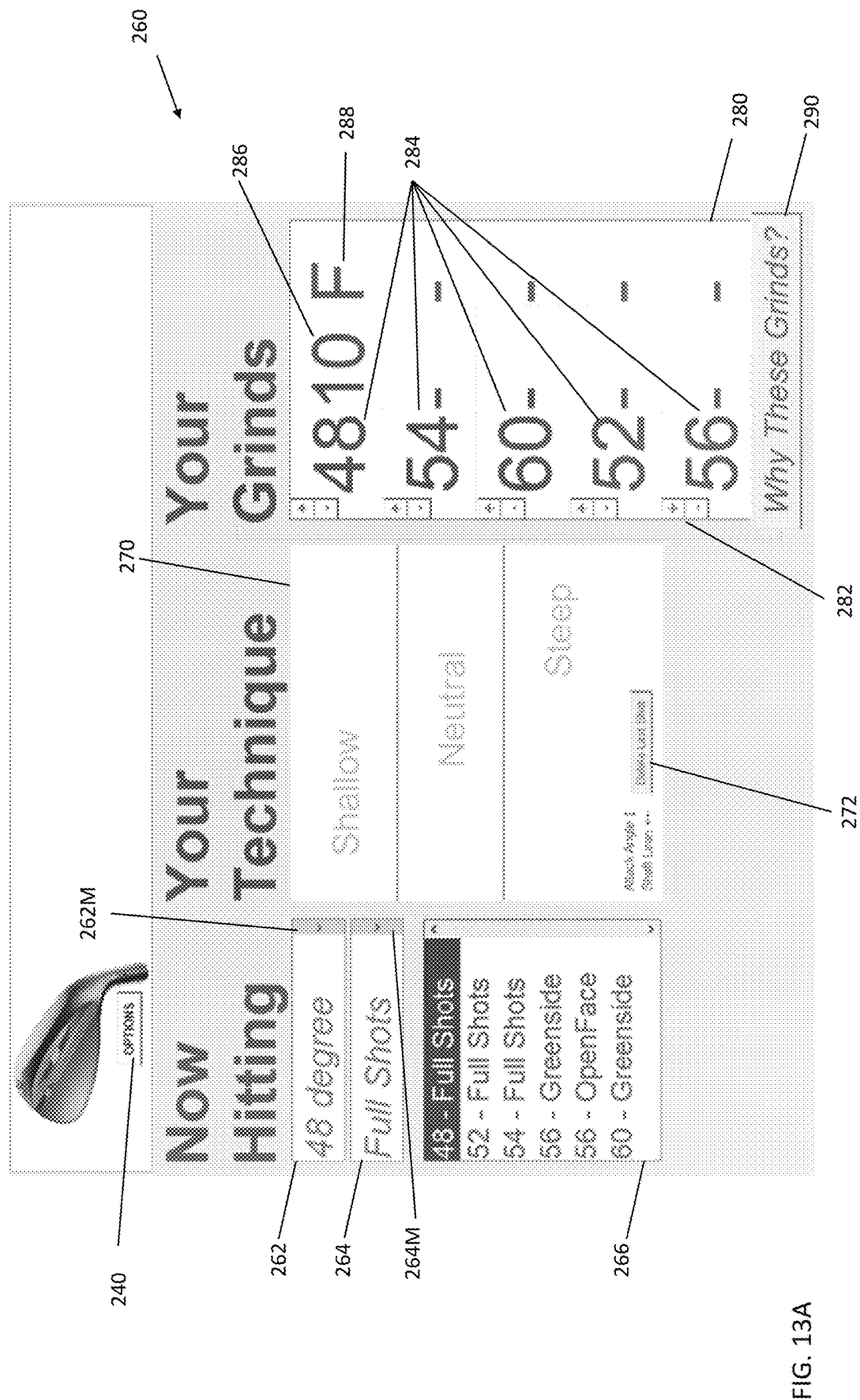
FIGS. 13A-13E depict a golf shot analysis segment of the second user interface of FIG. 11 at different stages of hitting golf shots.

FIG. 13A depicts the golf shot analysis segment 260 before any golf shots have been hit, and FIGS. 13B-13E depict the golf shot analysis segment 260 after one or more golf shots have been hit. Referring to FIGS. 13A-13E, the golf shot analysis segment 260 includes a current golf shot loft indicator 262, a current shot type indicator 264, a graphical technique representation 270, and a fitting recommendation representation 280. The current golf shot loft indicator 262 represents the loft of the next golf club that is to be used to hit a current golf shot. The current shot type indicator 264 represents the shot type that the current golf shot is to be hit by the golfer. Accordingly, the golfer can see which club the golfer should be hitting and the type of golf shot that the golfer should be hitting. The graphical technique representation 270 represents swing analytics of golf shots received by the computing device 800. The fitting recommendation representation represents a fitting recommendation for one or more golf clubs generated by the computing device 800.

The current golf shot loft indicator 262 may have a selectable pull down bar 262M configured, upon the computing device receiving selection of the pull down bar 262M, to cause a loft selection menu to be displayed. The loft selection menu may display one or more selectable lofts that, upon the computing device 800 receiving a selection of one of the lofts, will define the value of the current golf shot loft indicator 262 as the selected loft. However, examples of the present disclosure are not limited thereto, and the current golf shot loft indicator 262 may be controllable in other ways to allow the value of the current golf shot loft indicator 262 to be defined. Similarly, the current shot type indicator 264 may have a selectable pull down bar 264M configured, upon the computing device 800 receiving a selection of the pull down bar 264M, to cause a shot type selection menu to be displayed, such as a drop-down menu below the current shot type indicator 264. The shot type selection menu may display one or more selectable shot types that, upon the computing device 800 receiving selection of one of the shot types, will define the current shot type indicator 264 as the selected shot type. However, examples of the present disclosure are not limited thereto, and the current shot type indicator 264 may be controllable in other ways to allow the value of the current shot type indicator 264 to be defined. Because the launch monitor 840 may not be configured to determine what loft and shot type the golf shot being measured has, it may be important for the computing device 800 to correctly identify what loft and shot type are currently being used. For example, the computing device 800 may base its fitting recommendation not only on the swing analytics of a golf shot, but also on the loft and shot type of the golf shot. Accordingly, the computing device 800 may generate an inaccurate fitting recommendation when the loft and/or shot type of a golf shot is not correctly identified.

The golf shot analysis segment 260 includes a golf shot selection menu 266 including one or more combinations of a loft and a corresponding shot type. In FIGS. 13A-13E, the golf shot selection menu 266 includes six lofts—48, 52, 54, 56, 56, and 60 degrees from top to bottom—and six corresponding shot types—full shots, full shots, full shots, greenside, open face, and greenside from top to bottom. Each combination of loft and shot type in the golf shot selection menu 266 is selectable such that, upon the computing device 800 receiving selection of the combination, the current golf shot loft indicator 262 and the current shot type indicator 264 are respectively defined to be the loft and shot type of the selected combination. Accordingly, the golf shot selection menu 266 may provide a convenient way for a user of the computing device 800 to define the current golf shot loft indicator 262 and the current shot type indicator 264. Thus, when the swing analytics and/or ball flight data is received for the particular swing, the computing device 800 is aware of the golf club being used and the swing type being made, which allows for correlation of the swing analytics and/or ball flight data with the correct golf club and swing type.

In some examples, the combinations displayed in the golf shot selection menu 266 may correspond to the lofts 222 and corresponding shot types 226 of the golf shot prompt 220. In some other examples, the golf shot selection menu 266 may provide a standard or default recommendation of combinations of lofts and corresponding shot types based on, for example, hierarchical data stored in the computing device 800. In some examples, the golf shot selection UI element or menu 266 is configured to be adjustable to add combinations, remove combinations, and/or adjust the loft and/or shot type of the combinations. For example, the second user interface 200 may include a selectable golf shot prompt element configured to, upon the computing device 800 receiving selection thereof, to display the golf shot prompt 220 to allow the golf shot prompt 220 to be updated and, thereby, allow the golf shot selection menu 266 to also be updated.

In some examples, the swing analytics of golf shots measured by the launch monitor 840 include at least: (1) attack angle and (2) shaft lean, and the graphical technique representation 270 is a graph having a first axis representing attack angle and a second axis representing shaft lean. However, examples of the present disclosure are not limited thereto. For example, the swing analytics of the golf shots measured by the launch monitor 840 may include only attack angle or only shaft lean, and the graphical technique representation 270 may respectively graphically represent only attack angle or only shaft lean in any suitable manner (e.g., numerically, via a bar diagram, via a one-dimensional graph, etc.) Attack angle is the vertical direction of the club head's geometric center movement at maximum compression of the golf ball. Attack angle is measured relative to the horizon. Shaft lean is a measure of how far forward (e.g., towards the target) or backward the shaft of the golf club leans at maximum compression of the golf ball. The shaft lean is measured from vertical and may be measured as angle between the shaft and the vertical angle. A forward shaft lean has a positive angle value and the backward shaft lean has a negative angle value. Additional or alternative types of swing analytics may also be used with the present technology, such as dynamic loft or other types of measurements of the golf club as it is being swung. Dynamic loft is the amount of loft on the club face at impact and is measured relative to the horizon at maximum compression of the golf ball. Additional discussion of swing analytics examples is provided below with reference to FIGS. 17-20.

As shown in the example of FIG. 13A, in the graph of the graphical technique representation 270, the first axis representing the attack angle is a vertical axis and the second axis representing the shaft lean is a horizontal axis. The graphical technique representation 270 may be illustrated as divided into sections or bands characterizing the swing analytics of the golf shots. For example, as shown in FIG. 13A, the graphical technique representation 270 is divided into an upper region characterizing swing analytics falling in this region as "shallow", a middle region characterizing swing analytics falling in this region as "neutral", and a lower region characterizing swing analytics falling in this region as "steep". In some examples, the computing device 800 may generate its fitting recommendation based in part on the characterization of the swing analytics. While the graphical technique representation 270 is shown as a graph in this example, other visual representations for representing two or more swing analytics may be used.

As shown in FIGS. 13B-13E, as swing analytics for one or more golf shots are measured by the launch monitor 840 and received by the computing device 800, one or more shot indicators 274 are displayed on the graphical technique representation 270 to represent the swing analytics of corresponding group of shots. For example, each of the shot indicators 274 may represent the technique of golf shots of a same shot type. In some examples, each of the shot indicators 274 may represent the technique of golf shots of a same loft. In some other examples, each of the shot indicators 274 represents the technique of golf shots of both the same shot type and the same loft. In some examples, a single shot indicator 274 may be used to represent the swing analytics of all golf shots.

The shot indicator 274 may include any suitable graphic, image, symbol, etc. For example, the shot indicators 274 may include geometric shapes, such as circles, squares, etc.

In some examples, the shot indicator 274 may include text, for example, to indicate what group of golf shots the shot indicator 274 corresponds to, how many golf shots are in the corresponding group of golf shots, etc. A size of the shot indicator 274 may represent how many golf shots are in the corresponding group of golf shots. For example, as golf shots of the corresponding group are hit, the size of the shot indicator 274 may decrease, and thus, the size (e.g., smallness) of the shot indicator 274 may correspond to how many golf shots of the corresponding group have been hit.

A position of each of the shot indicators 274 (e.g., a position of a center of the shot indicators 274) in the graphical technique representation 270 may represent a statistical value of the swing analytics of the golf shots of the corresponding group of golf shots, such as an average value or medium value. Each of the shot indicators 274 may be updated after swing analytics of each golf shot of the corresponding group of golf shots are received by the computing device 800.

Figure 13B:
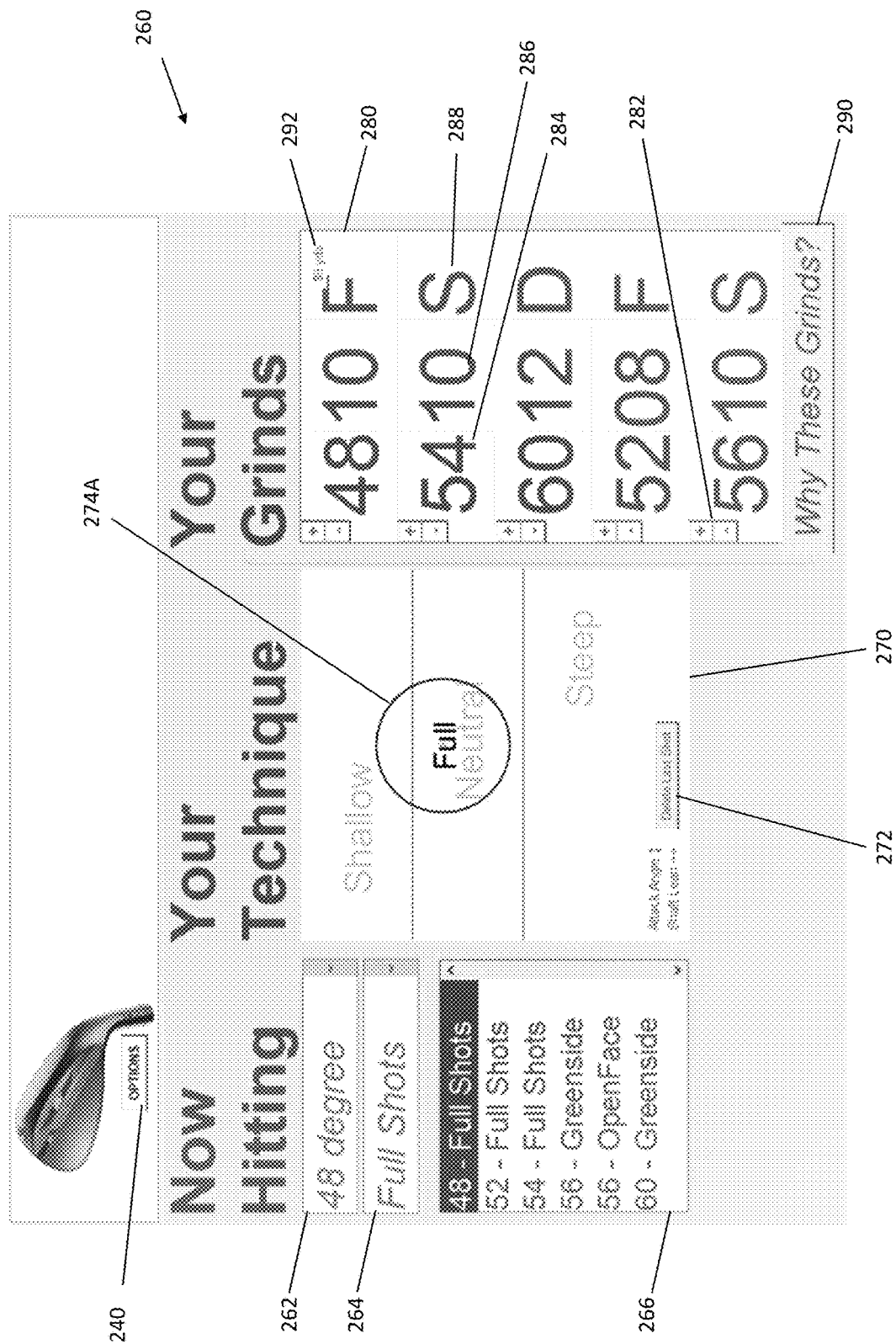

FIG. 13B depicts the golf shot analysis segment 260 after a first golf shot of a full swing type is hit. When the first golf shot of the full swing type is hit, a first shot indicator 274A corresponding to a full swing shot type is displayed in the graphical technique representation 270. In the example depicted, the first shot indicator 274A includes a circle with the word "Full" in the middle to indicate that the shot type is a "Full": shot type. The position of the first shot indicator 274A (e.g., the center of the circle) corresponds to an attack angle and shaft lean of the first golf shot of the full swing type.

Figure 13C:
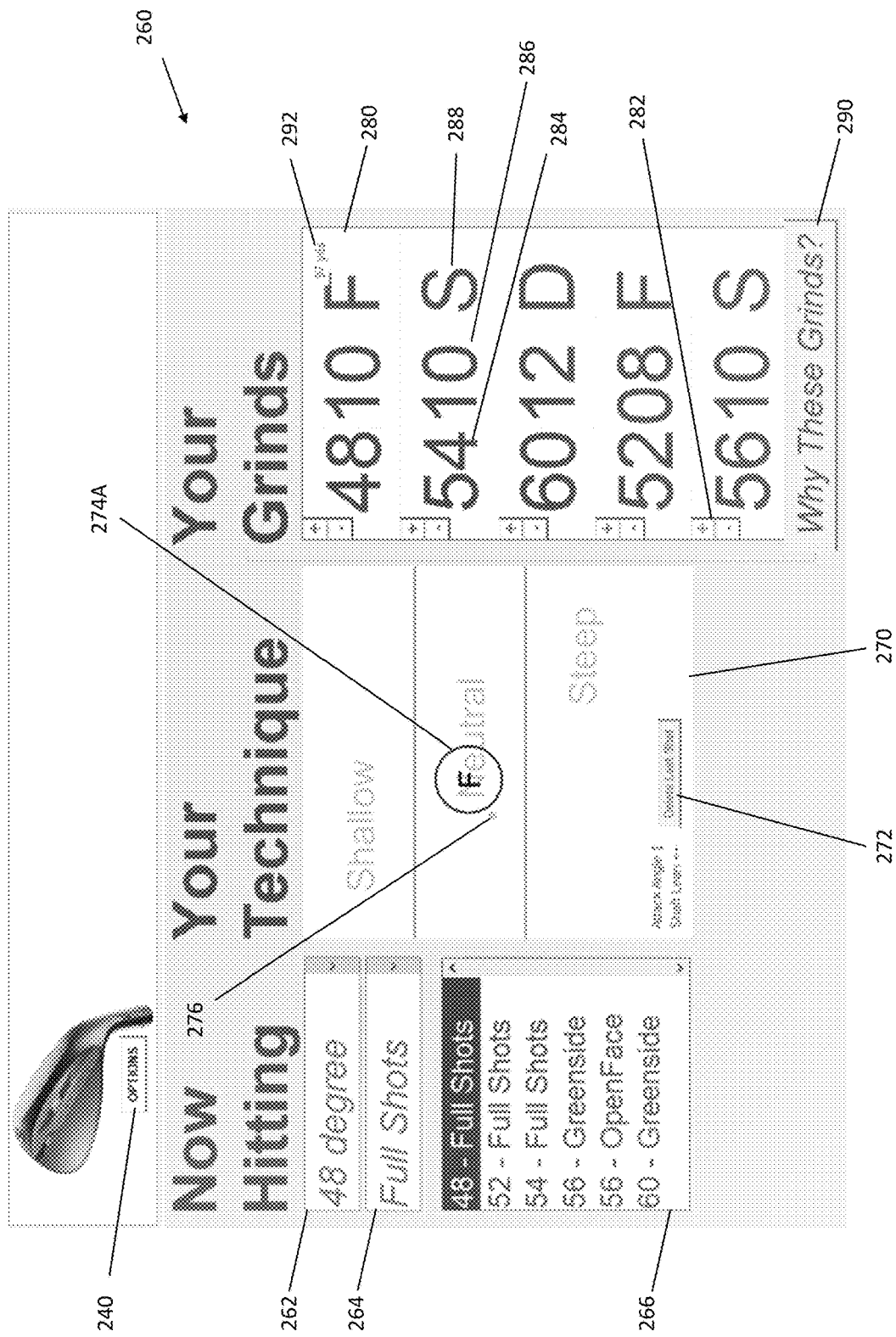

FIG. 13C depicts the golf shot analysis segment 260 after a second golf shot of the full swing type is hit. When the second golf shot of the full swing type with the same golf club is hit, the size and position of the first shot indicator 274A is updated. For example, a diameter of the circle included in the first shot indicator 274A is reduced, the text inside the circle included in the first shot indicator 274A is changed to "F" (short for "Full"), and the position of the center of the circle is shifted to point on the graphical technique representation 270 corresponding to an average attack angle of the first and second golf shots of the full swing type and to an average shaft lean of the first and second golf shots of the full swing type.

As shown in FIG. 13C, the graphical technique representation 270 may include a current shot indicator 276 that indicates the swing analytics of the most recent golf shot received by the computing device 800. Accordingly, in FIG. 13C, the current shot indicator 276 is positioned at the attack angle and shaft lean of the second golf shot of the full swing type. The current shot indicator 276 may include any suitable graphic, image, symbol, etc. In FIG. 13C, the current shot indicator 276 is illustrated as a dot or filled circle. The current shot indicator 276 helps a user of the computing device 800 determine whether their most recent golf shot is an outlier that, for example, significantly diverges from the earlier golf shots, and thus, should be deleted to avoid unduly affecting the graphical technique representation 270 and the fitting recommendation.

In some examples, the golf shot analysis segment 260 includes a delete shot button 272 configured to, upon the computing device 800 receiving a selection thereof, to cause the computing device 800 to update the graphical technique representation (including the shot indicators 274) without consideration of the swing analytics of the most recent shot, and/or to update the fitting recommendation without consideration of the swing analytics of the most recent shot. This may be achieved by the computing device 800 deleting information stored in the computing device 800 relating to the swing analytics of the most recent shot. For example, if the delete shot button 272 was selected after the second golf shot of the full swing type was hit, as shown in FIG. 13C, the graphical technique representation 270 may be updated based on only the swing analytics of the first golf shot of the full swing type, as shown in FIG. 13B.

Figure 13D:
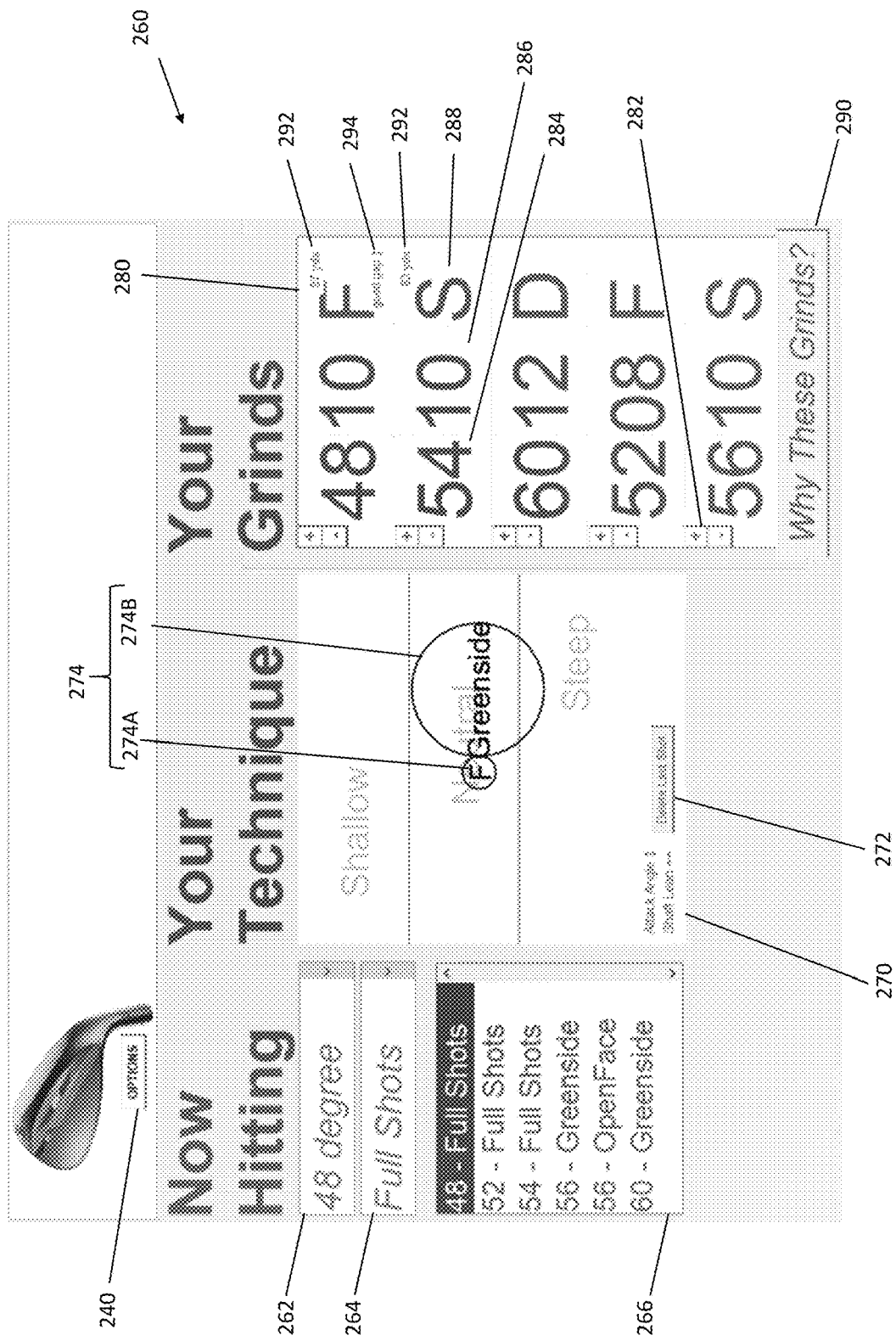

FIG. 13D depicts the golf shot analysis segment 260 after several golf shots of the full swing type have been hit and after a first golf shot of a greenside type has been hit as a most recent golf shot having swing analytics received by the computing device 800. After the first golf shot of the greenside type is hit, a second shot indicator 274B is depicted in the graphical technique representation 270. The second shot indicator 274B includes a circle and the text, "Greenside", in the middle of the circle. A position of the center of the circle of the second shot indicator 274B corresponds to the attack angle and shaft lean of the first golf shot of the greenside type.

Figure 13E:
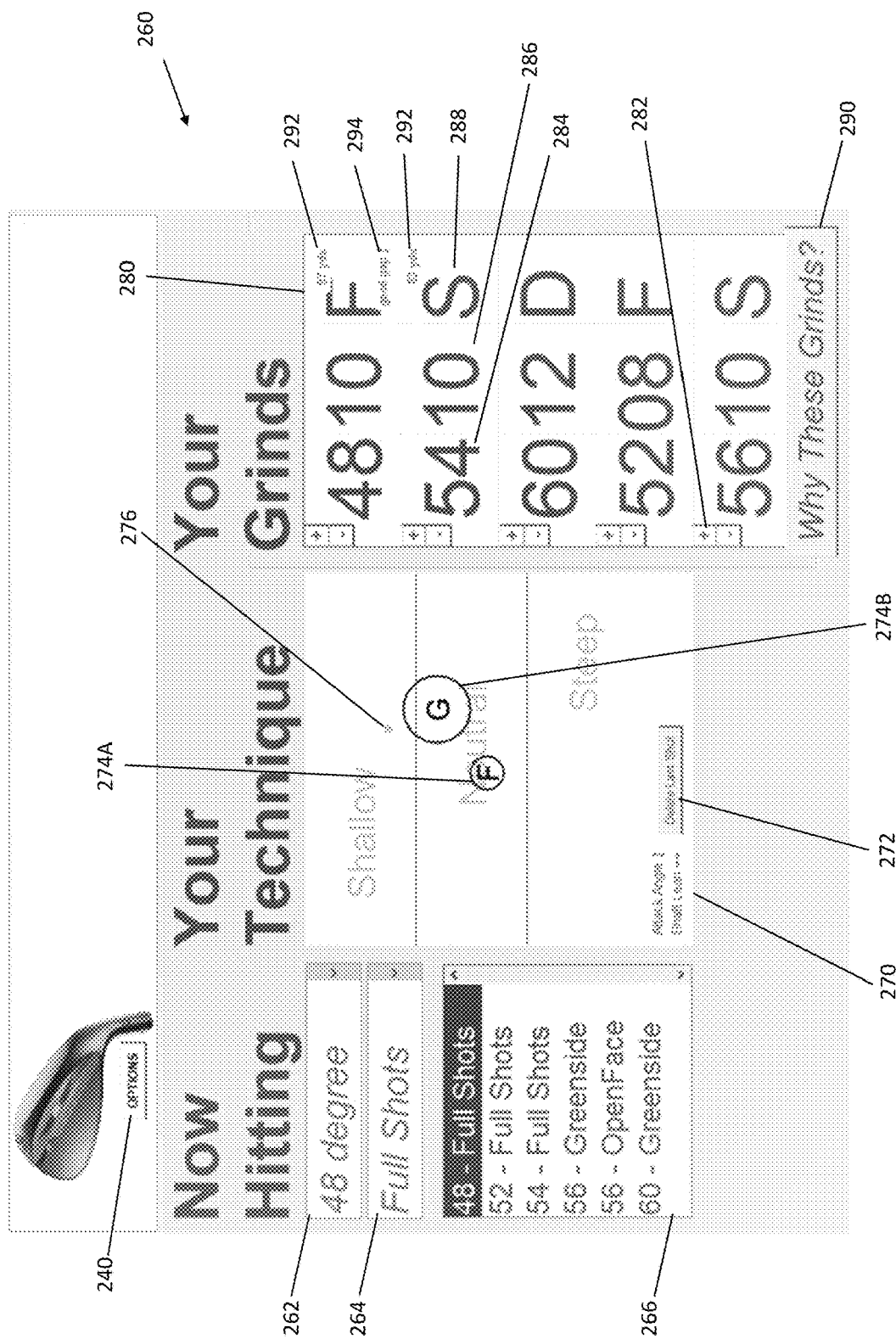

FIG. 13E depicts the golf shot analysis segment 260 after a second golf shot of the greenside type is hit. When the second golf shot of the greenside type is hit, the second shot indicator 274B is updated so that a diameter of the circle is reduced, the text inside the circle is changed to "G" (short for "Greenside"), and the position of the center of the circle is shifted to a point on the graphical technique representation 270 corresponding to an average attack angle of the first and second golf shots of the greenside type and to an average shaft lean of the first and second golf shots of the greenside type.

The graphical technique representation 270 is useful for, among other reasons, a player hitting the golf shots to understand their golf technique (e.g., swing analytics) for different types of shots, for different lofts, and/or for different types of shots of the same loft.

The fitting recommendation representation 280 includes one or more lofts 284, and each of the lofts 284 includes a corresponding fitting recommendation including a recommended bounce 286 and/or grind 288 for the loft 284. The computing device 800 generates one or more fitting recommendations for a corresponding loft based at least in part on the player input data and/or the swing analytics of one or more golf shots measured by the launch monitor 840 and received by the computing device 800. In some examples, the computing device 800 may generate the fitting recommendations further based at least in part on ball flight characteristics of the golf shots.

In some examples, the fitting recommendations corresponding to a loft is based at least in part on the swing analytics of all of the golf shots measured by the launch monitor 840. In other examples, the fitting recommendation corresponding to the loft is based at least in part on the swing analytics of a subset of all of the golf shots, for example, all golf shots hit with a golf club having the corresponding loft. The fitting recommendations corresponding to the loft may be based on all of the swing analytics of one or more golf shots, such as both attack angle and shaft lean, or the fitting recommendation may be based on only some of the swing analytics of the one or more golf shots, such as only attack angle or only shaft lean.

In some examples, the lofts 284 included in the fitting recommendation representation 280 are the same as the lofts included in the golf shot selection menu 266 and/or in the golf shot prompt 220. As shown in FIGS. 13A-13E, the lofts included in the fitting recommendation representation 280 include, from top to bottom, lofts of 48 degrees, 54 degrees, 60 degrees, 52 degrees, and 56 degrees.

In FIG. 13A, a fitting recommendation including a bounce of 10 degrees and an F-grind is provided for the loft of 48 degrees, even though swing analytics have not been received by the computing device 800 for any golf shots. This is because, in this example, the generation of the fitting recommendation for the 48 degree loft is not based on swing analytics. For example, the generation of the fitting recommendation for the 48 degree loft may be based only on player input data, or only one possible fitting recommendation may be available for a 48 degree loft. In FIG. 13A, fitting recommendations for the remaining lofts of 54 degrees, 60 degrees, 52 degrees, and 56 degrees are not provided because, in this example, the generation of the fitting recommendations corresponding to these lofts depends at least in part on swing analytics of one or more golf shots.

In FIG. 13B, after the first golf shot of the full swing type is hit, a recommendation is generated for each of the remaining lofts of 54 degrees, 60 degrees, 52 degrees, and 56 degrees in the fitting recommendation representation 280. As shown in FIG. 13B, the fitting recommendation for the 54 degree loft is a 10 degree bounce and an S-grind, the fitting recommendation for the 60 degree loft is a 12 degree bounce and a D-grind, the fitting recommendation for the 52 degree loft is an 8 degree bounce and an F-grind, and the fitting recommendation for the 56 degree loft is a 10 degree bounce and an S-grind.

In some examples, as explained in more detail below with reference to FIG. 14, the computing device 800 generates a fitting recommendation after receiving a plurality of swing analytics of a plurality of golf shots, for example, after receiving swing analytics for a threshold number of golf club shots. In some examples, the computing device 800 receives swing analytics for a plurality of golf shots and updates the fitting recommendation after receiving the swing analytics of each of the plurality of golf shots.

The golf shot analysis segment 260 may include one or more carry distance representations 292 representing a carry distance of the golf shots measured by the launch monitor 840. In some examples, a single carry distance representation 292 may be included that represents, for example, a carry distance of the most recent golf shot or an average carry distance of all golf shots, and the carry distance representation 292 may be updated each time the computing device 800 receives ball flight characteristics of a new golf shot. In some other examples, a plurality of carry distance representations 292 corresponding to each of the lofts 284 of the fitting recommendation representation 280 are included and represent, for example, the carry distance of the most recent golf shot hit with a golf club having the corresponding loft 284 or the average carry distance of golf shots hit with golf clubs having the corresponding loft 284. In this example, as shown in FIGS. 13B-13E, the golf shot analysis segment 260 includes a plurality of carry distance representations 292 corresponding to the plurality of lofts 284 of the fitting recommendation representation 280.

The golf shot analysis segment 260 may include one or more gapping quality representations 294 representing whether a gapping (e.g., an average carry distance difference between two or more golf clubs of different lofts) is good or bad. The gap quality representation 294 may include text, for example, "good gap", to indicate that a gapping between two or more lofts is good, and may include text, for example, "bad gap", to indicate that the gapping is poor. The "good gap" text may be used, for example, when an average carry distance difference between golf clubs of two lofts is less than a threshold value, and the "bad gap" text may be used, for example, when the average carry distance difference is greater than the threshold value or outside of a range threshold (e.g., the carry difference is too small or too large). For example, as shown in FIGS. 13D and 13E, a gap quality representation 294 including the "good gap" text is provided after golf shots are hit with golf clubs having a 48 degree loft and a 54 degree loft. In some examples, a single gapping quality representation 294 may be provided that is based on, for example, average carry distances corresponding to each of the lofts 284. In some other examples, a gapping quality representation 294 may be provided for each two adjacent lofts among the lofts 284. The determinations for the gapping quality may also result in different loft recommendations. For instance, the series of recommended lofts are updated in the fitting recommendation representation 280. For example, if a gap between two lofts was too large, one or more of those lofts may be updated such that the difference in loft values becomes less.

In some examples, the golf shot analysis segment 260 includes a selectable options element 240. In response to the computing device 800 receiving a selection of the options element 240, one or more controllable options may be displayed in the golf shot analysis segment 260. FIGS. 13A-13E show the selectable options button 240 as provided at a top portion of the golf shot analysis segment 260 before a selection thereof is received by the computing device 800.

FIG. 14 depicts the top portion of the golf shot analysis segment of FIGS. 13A-13E after a selection of the options button 240 has been received by the computing device 800. The displayed options include a selectable estimate option 241, a selectable show shot types option 242, a selectable show shot table option 243, a selectable minimize option 244, a controllable conditions shot threshold option 245, a controllable shot threshold option 246, a selectable last shot option 247, a selectable save option 248, a selectable player input data option 249, a selectable carry/gapping option 250, and a controllable fitting type option 251.

Upon receiving a selection of the estimate option 241 by the computing device 800, if the launch monitor 840 is unable to measure all of the swing analytics for a golf shot, then the computing device 800 may use an estimated value of the missing swing analytics of the golf shot. The estimated value may, for example, be based on the swing analytics that were measured for the golf shot and/or hierarchical data stored in the computing device 800.

For example, the computing device 800 may use attack angle and shaft lean to update the graphical technique representation 270 and generate or update the fitting recommendation. If the launch monitor 840 measures one of the attack angle and shaft lean of a golf shot but is unable to measure (e.g., due to error or inability to measure) the other one of the attack angle and shaft lean of the golf shot, then the computing device 800 may use an estimated value of the other one of the attack angle and shaft lean.

If the computing device 800 does not receive a selection of the estimate option 241, or receives a deselection of the estimate option 241, then the computing device 800, upon receiving an incomplete portion of swing analytics for a golf shot from the launch monitor 840, may either use the incomplete portion of the swing analytics or discard the incomplete portion of the swing analytics and indicate on the golf shot analysis segment 260 that no measurement was received.

Upon receiving a selection of the show shot type option 242 by the computing device 800, the golf shot control menus 224 (see FIG. 12) may be displayed in the golf shot analysis segment 260, for example, in the fitting recommendation representation 280 of the golf shot analysis segment 260 next to corresponding ones of the lofts 284 to allow the golf shot control representations 224 to be updated as described above with reference to FIG. 12. Upon receiving a deselection of the show shot type option 242 by the computing device 800, display of the golf shot control representations 224 may cease.

Upon receiving a selection of the show shot table option 243 by the computing device 800, a shot type table including information, such as the swing analytics and/or ball flight characteristics of each of the golf shots measured by the launch monitor 840 and received by the computing device 800, may be displayed in the golf shot analysis segment 260. The shot type table may be controllable or adjustable, for example, to allow the computing device 800 to receiving instructions via the table to delete the information relating to the golf shots. Upon receiving a deselection of the show shot table option 243, display of the shot type table may cease.

When selected, the selectable minimize option 244 causes at least a portion of, or all of, the golf shot analysis segment 260 to be automatically minimized when a shot is hit. The controllable conditions shot threshold option 245 allows for a number of shots to be collected for a certain condition, such as a greenside condition.

The shot number threshold option 246 is controllable to allow the computing device 800 to receive instructions via the shot number threshold option 246 of the number of golf shots, swing analytics of which are to be received by the computing device 800, before the computing device 800 generates an initial fitting recommendation. As shown in FIG. 14, the number of golf shots in the shot number threshold option 246 is set to 1, and as shown in FIGS. 13A and 13B, the fitting recommendation representation 280 provides a fitting recommendation for each of the lofts 284 after receiving swing analytics for one golf shot (i.e., the first golf shot of the full swing type). If the number of golf shots in the shot number threshold option 246 were instead set to 3, then the fitting recommendation representation 280 would not provide a fitting recommendation for all of the lofts 284 until the computing device 800 had received swing analytics for at least three golf shots.

Upon receiving selection of the last shot option 247 by the computing device 800, the graphical technique representation 270 will include the current shot indicator 276 and, upon receiving a deselection of the last shot option 247, the graphical technique representation will cease to include the current shot indicator 276.

Upon receiving selection of the save option 248 by the computing device 800, settings of the options are saved.

Upon receiving selection of the player input data option 249 by the computing device 800, at least one or more of the input fields of the first user interface 100 may be displayed and rendered controllable as described above with reference to FIG. 10. This allows a user of the computing device 800 to update or enter the player input data at any time, for example, before or after hitting one or more golf shots.

Upon receiving selection of the carry/gapping option 250 by the computing device 800, the carry distance representation 292 and/or the gapping quality representation 294 may be displayed as described herein. Upon receiving deselection of the carry/gapping option 250 by the computing device 800, display of the carry distance representation 292 and/or the gapping quality representation 294 may cease.

The controllable fitting type option 251 allows for selection of how many shots (e.g., total shots) are to be collected or analyzed during the fitting process. In the example depicted, 18 shots are selected. The controllable fitting type option 251 may provide for selecting a larger or smaller number of shots to be collected or analyzed to complete a fitting session.

In some examples, the golf shot analysis segment 260 includes a selectable user interface element 290. Upon receiving selection of the user interface element 290 by the computing device 800, a third user interface 300 is displayed, as shown in FIG. 15.

Referring to FIG. 15, the computing device 800 may generate, for each of the lofts 284, one or more fitting recommendations, each including a bounce angle and a grind. The computing device 800 may rank the one or more fitting recommendations in order of most recommended to least recommended, and display the most recommending fitting recommendation for each of the lofts 284 in the fitting recommendation representation 280. The third user interface 300 provides additional details about the one or more fitting recommendations of each of the lofts 284.

The third user interface 300 includes a first column 310, a second column 320, a third column 330, and a fourth column 340. The first column 310 includes each of the lofts 284 of the fitting recommendation representation 280, and may also include the most recommended fitting recommendation for each of the lofts 284. The second column 320 includes an explanation regarding why a certain fitting recommendation among the one or more fitting recommendations of the corresponding loft was selected as the most recommended fitting recommendation.

The third column 330 may include all of the fitting recommendations generated for each of the lofts 284, which may be separated into groups of fitting recommendations corresponding to the same loft 284. For example, as shown in FIG. 15, the third column 330 includes a plurality of groups 332, each group 332 including one or more fitting recommendations generated for the same loft 284. One of the groups 332 corresponding to the 48 degree loft includes a first fitting recommendation including a 10 degree bounce and an F-grind. Another one of the groups 332 corresponding to the 54 degree bounce includes two fitting recommendations: a first fitting recommendation including a 10 degree bounce and an S-grind, and a second fitting recommendation including a 12 degree bounce and a D-grind. Another one of the groups 332 corresponding to the 60 degree loft includes three fitting recommendations: a first fitting recommendation including a 12 degree bounce and a D-grind, a second fitting recommendation including an 8 degree bounce and an M-grind, and a third fitting recommendation including a 10 degree bounce and an S-grind. Another one of the groups 332 corresponding to the 52 degree loft includes a first fitting recommendation including an 8 degree bounce and an F-grind. Another one of the groups 332 corresponding to the 56 degree loft includes three fitting recommendations: a first fitting recommendation including a 10 degree bounce and an S-grind, a second fitting recommendation including an 8 degree bounce and an M-grind, and a third fitting recommendation including a 12 degree bounce and a D-grind. Each of the groups 332 may be separated from adjacent groups 332 by one or more rows (e.g., blank rows).

The fourth row 340 includes, for each fitting recommendation of each group 332, a corresponding rank indicator, such as a percent match 342 (defined as a percentage value out of 100%), to indicate how highly each fitting recommendation of the corresponding group 332 is recommended. For example, of the group 332 corresponding to the 60 degree loft, the first fitting recommendation (i.e., 12 degree bounce and D-grind), the second fitting recommendation (i.e., 8 degree bounce and M-grind), and the third fitting recommendation (i.e., 10 degree bounce and S-grind) respectively have a percent match 342 of 70%, 24%, and 6%.

Although information included in the third user interface 300 described above according to an example of the present disclosure is illustrated and described as being organized into columns, rows, groups, etc. this is provided as a non-limiting example, and the information included in the third user interface 300 may be organized in any suitable manner.

Figure 16B:
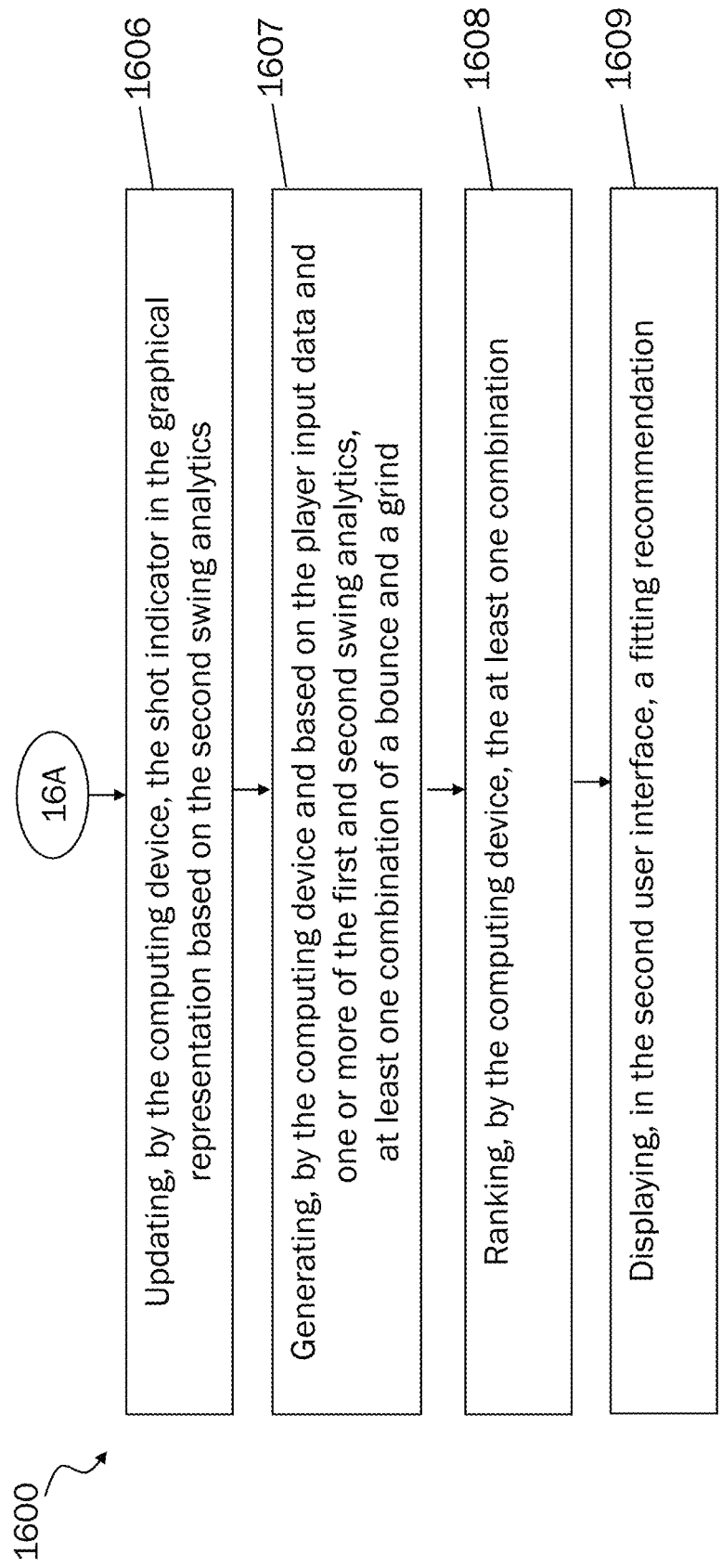

FIGS. 16A and 16B depict a method 1600 of generating a fitting recommendation according to an example. During operation 1601, the first user interface 100 including input fields (e.g., first to sixth input fields 101-106) is displayed on the display 820 of the computing device 800. During operation 1602, the computing device 800 receives as input into the input fields of the first user interface, player input data. During operation 1603, the computing device 800 receives from the launch monitor 840, first swing analytics for a first golf shot. For example, the computing device 800 may receive at least attack angle and/or shaft lean for the first golf shot. During operation 1604, the computing device 800 displays, on the display 820, the second user interface 200 including the graphical technique representation 270 with the shot indicator 274 representing the first swing analytics. During operation 1605, the computing device 800 receives from the launch monitor 840 second swing analytics for a second golf shot. For example, the computing device 800 may receive at least attack angle and/or shaft lean for the second golf shot. In some examples, the first and second golf shots are of the same type, and in other examples, the first and second golf shots are respectively of a first shot type and of a second shot type different from the first shot type.

During operation 1606, the computing device 800 updates the shot indicator 274 based on the second swing analytics. During operation 1607, the computing device 800 generates, based on the player input data and/or one or more of the first and second swing analytics, at least one fitting recommendation. The fitting recommendation(s) may include a corresponding bounce and/or grind for a golf club having a loft. For example, the computing device 800 may generate three combinations of bounce and grind for a golf club having a 60 degree loft. During operation 1608, the computing device 800 ranks the at least one fitting recommendation based on the player input data and/or one or both of the first and second swing analytics. During operation 1609, the computing device 800 displays, in the second user interface 200, a most recommended one of the at least one fitting recommendations for the golf club. For example, the computing device 800 may display in the fitting recommendation representation 280 a fitting recommendation including a recommended bounce 286 and a recommended grind 288 for the golf club having the 60 degree loft.

Figure 17:
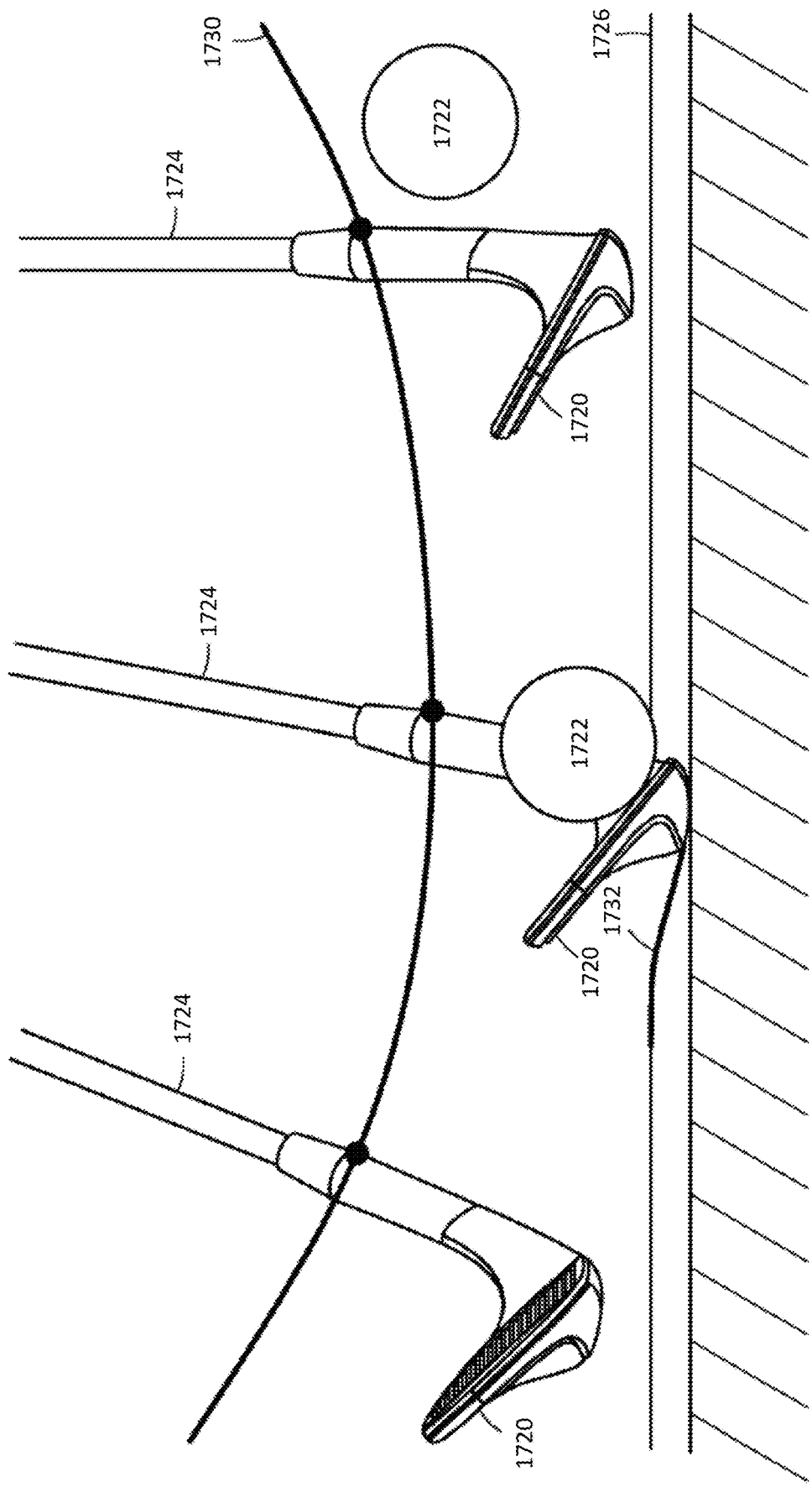
FIG. 17 depicts a simulated view of images captured by a launch monitor illustrating the impact of a golf swing.
Figure 18:
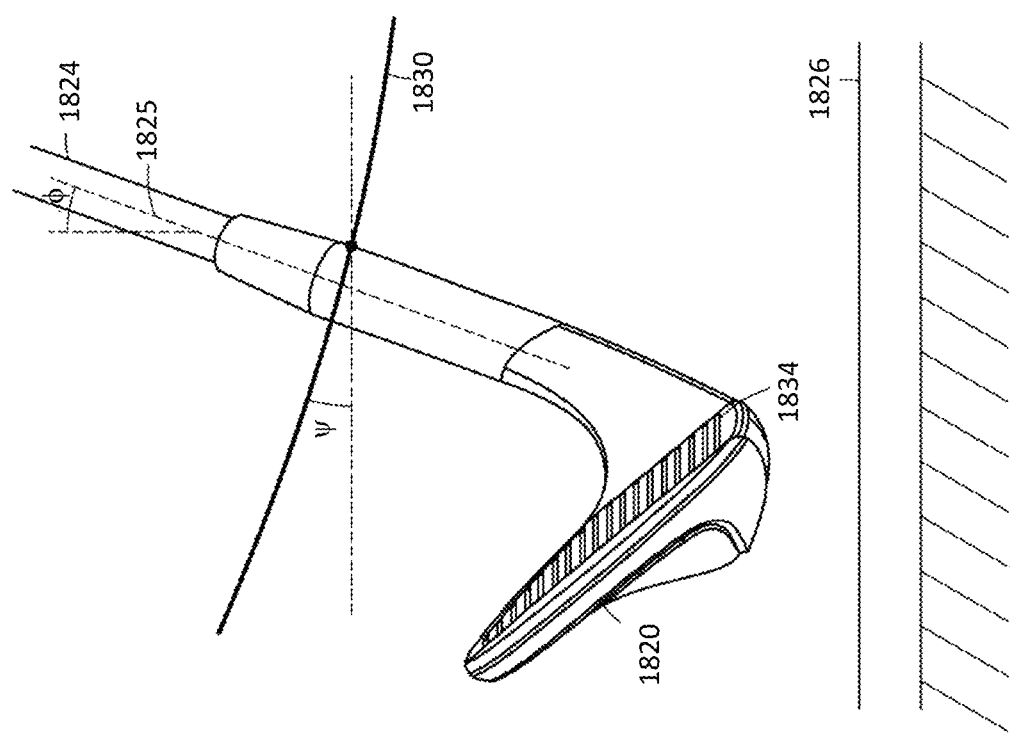
FIG. 18 depicts an enlarged view of an image captured by a launch monitor illustrating a golf club before impact with a golf ball.
Figure 19:
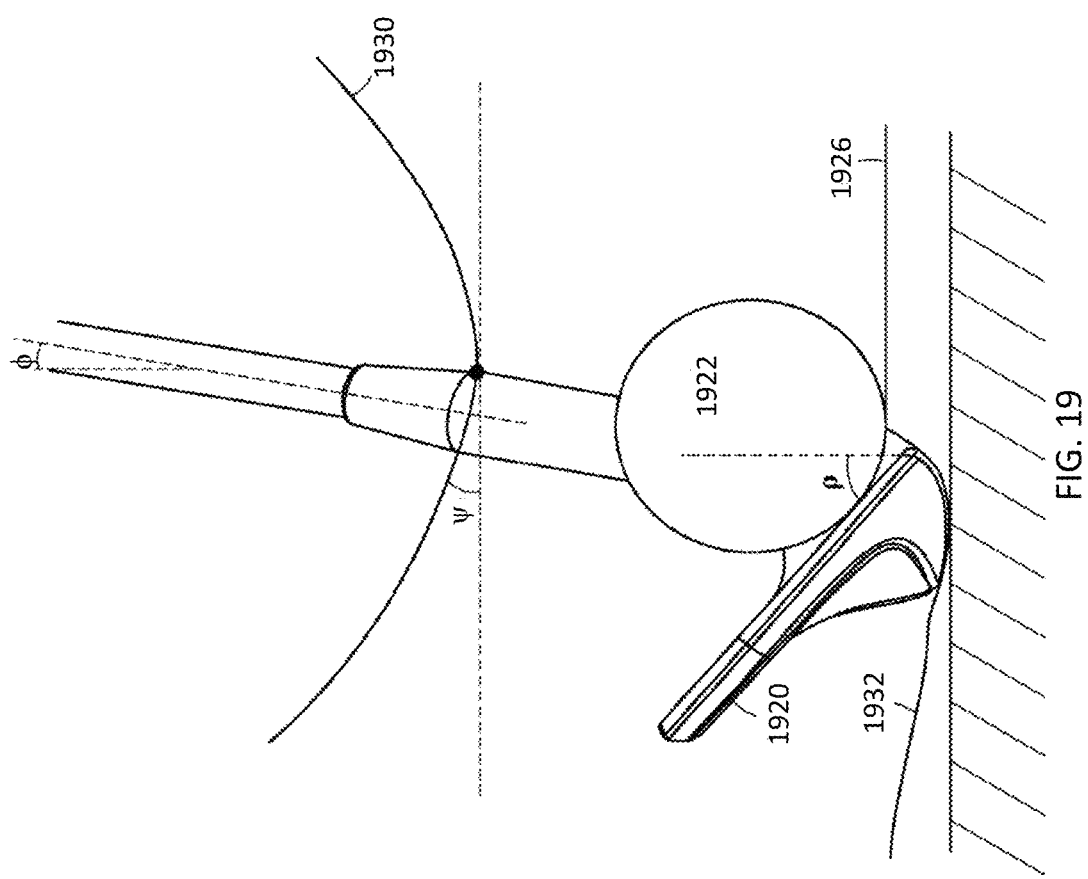
FIG. 19 depicts an enlarged view of an image captured by a launch monitor illustrating a golf club right as it impacts the golf ball.
Figure 20:
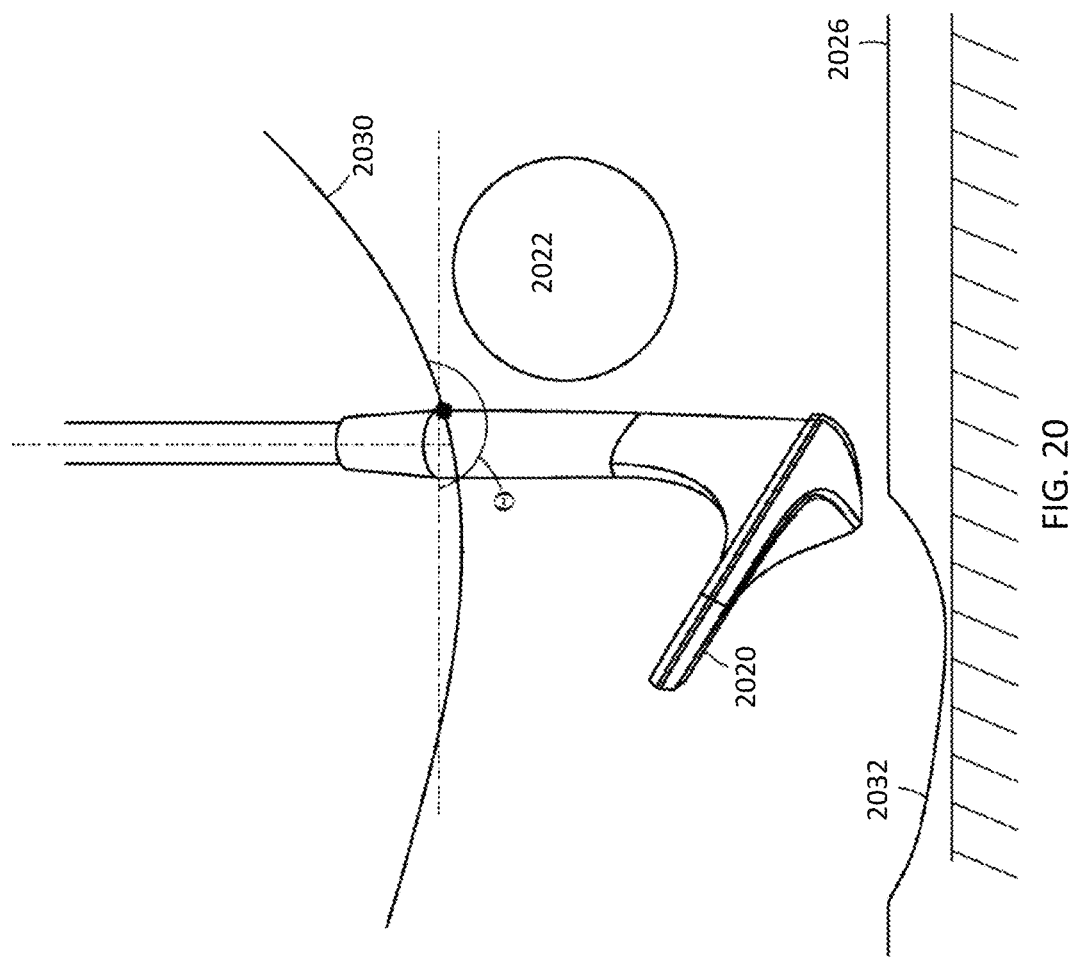
FIG. 20 depicts an enlarged view of an image captured by a launch monitor illustrating a golf club right after it impacts the golf ball.

Some additional discussion of example swing analytics, such as attack angle and shaft lean, is provided below with reference to FIGS. 17-20. FIG. 17 depicts a simulated view of images captured by a launch monitor illustrating the impact of a golf swing. FIG. 18 depicts an enlarged view of an image captured by the launch monitor illustrating a golf club before impact with a golf ball. FIG. 19 depicts an enlarged view of an image captured by a launch monitor illustrating a golf club right as it impacts a golf ball. FIG. 20 depicts an enlarged view of an image captured by a launch monitor illustrating a golf club right after it impacts the golf ball.

FIG. 17 shows a schematic of an overview of the different conditions that a golf club head 1720 goes through during a golf swing. Although the launch monitor usually focuses on individual frames, this overview shown in FIG. 17 provides some initial context to what an iron type golf club head 1720 looks like when it interacts with the ground on an actual golf shot. It can be seen that on the left side of FIG. 17, golf club head 1720 is approaching the golf ball 1722 from a steep angle with a significant amount of shaft lean. During impact, which is depicted by the figure in the middle of the page, the golf club head 1720 may engage the ground plane 1726 by hitting down on the golf ball 1722 and going beneath the ground plane 1726. This type of ball striking motion may generally leave a divot 1732 on the ground. When the fitting is being performed indoors, artificial turf may be used in which a permanent divot may not be left in the artificial turf. Instead, the artificial turf may temporally depress or compress upon impact by the golf club head 1720. Finally, on the right side of FIG. 17, the golf club head 1720 has completed the golf swing and the golf ball 1722 has left the striking face portion of the golf club head 1720. It is at this point, where the shaft 1724 may generally be substantially vertical. In order to provide a better illustration of the individual scenarios, FIGS. 18, 19, and 20 have been provided here with enlarged views of the golf club heads 1720.

FIG. 18 shows an enlarged view of a golf club head 1820 right before it impacts a golf ball. FIG. 18 shows an angle of attack $\psi$ and shaft lean angle $\phi$. In this enlarged view of the golf club head 1820, before the golf club head 1820 contacts the golf ball, the golf club head 1820 stands above the ground plane 1826, coming in at an angle of attack $\psi$ that follows the swing path 1830 of the golf club head 1820. The angle of attack $\psi$ of each individual golfer may differ from each other depending on their particular golf swing, but may generally be between about 0 degrees to about −15 degrees, but could also be any other number depending on the golfer's golf swing. It is worthwhile to note here that the angle $\psi$ here is negative, which is indicative of a downward angle of motion relative to a horizontal ground plane.

In addition to the angle of attack, FIG. 18 also shows the shaft lean angle $\phi$ as the amount of forward shaft lean the golfer demonstrates before contacting a golf ball. Most golfers that are hitting down on a golf ball will have a shaft lean angle $\phi$ of between about 0 degrees to about 20 degrees, but that number could differ depending on the particular golfer's swing to even being a negative number.

FIG. 18 of the accompanying drawings also allows another potential swing analytic referred to a face angle to target line, or simply known as face angle to some in the industry. The face angle refers to the angle of the golf club head 1820 as it relates to the target line, which in this illustration of FIG. 18, is pointed to the right. Although not specifically identified by any Greek symbols, the launch monitor is capable of capturing this by focusing on the angle of the scorelines relative to either the ground plane or the shaft axis 1825.

FIG. 19 depicts an enlarged view of a golf club head 1920 as it impacts a golf ball 1922 (e.g., at a point of maximum compression). In this enlarged view of the golf club head 1920, we can see that when the golf club head 1920 contacts the golf ball 1922, it goes beneath the ground plane 1926, creating a divot 1932 in the ground. In some examples, the divot 1932 may occur slightly before impact with a golf ball 1922. Because of this interaction with the ground 1926, the launch monitor may be able to adjust its location and shift the focus of the launch monitor to an alternate location that doesn't contain the divot 1932. As discussed above, in indoor fittings where artificial turf is used, the divot 1932 may not be present or may be temporary as the artificial turf compresses upon impact with the golf club head 1920. In this frame of the golf swing captured in FIG. 19, it can be seen that the angle of attack ψ, may still be in a downward motion following swing path 1930. This angle of attack ψ, depending on the golfer's swing, may generally be between about 0 degrees to about −15 degrees. The shaft lean angle φ may also change depending on the golfer, but may generally be between about 0 degrees to 20 degrees.

In addition to the above, FIG. 19 also shows another potential swing analytic referred to as dynamic loft ρ. Dynamic loft ρ generally relates to the loft of the golf club head 1920 relative to a vertical plane. This dynamic loft ρ, which occurs during a golf swing, is generally different from the actual static loft of the golf club head 1920 because dynamic loft ρ includes other variables such as shaft lean angle φ, swing path 1930 amongst numerous other variables. In this image captured in FIG. 19, the static loft of the golf club head 1920 may be about 60 degrees, but the dynamic loft ρ may be less due to the forward shaft lean angle φ, yielding a dynamic loft ρ of about 45 degrees.

FIG. 20 depicts an enlarged view of a golf club head 2020 after it has impacted the golf ball 2022. In this enlarged view of the golf club head 2020, after the impact with the golf ball 2022, the golf club head 2020 may leave a divot 2032 on the ground and begin travelling in an upward direction. In this frame of the golf swing captured in FIG. 20, the angle of attack Θ is a positive number to represent that the golf club head is heading in an ascending path, more specifically between about 10 degrees and 20 degrees. A positive path generally mean that the golf club head is traveling along a swing path 2030 that is now in an upward motion. Finally, the shaft lean angle in this embodiment is generally 0 degrees at some point during the moments after the impact.

The launch monitor may also be capable of capturing golf ball 2022 characteristics, such as the golf ball 2022 launch angle and the golf ball 2022 spin.

Although specific devices and features have been recited throughout the disclosure as performing specific functions, one of skill in the art will appreciate that these devices and features are provided for illustrative purposes, and other devices and features may be employed to perform the functionality disclosed herein without departing from the scope of the disclosure. This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method for generating a fitting recommendation for a golf club, the method comprising:
   receiving, by a computing device, player input data;
   receiving, by the computing device from a launch monitor communicatively coupled to the computing device, first swing analytics for at least one golf shot of a first shot type; and
   based on the player input data and the first swing analytics, generating, by the computing device, the fitting recommendation comprising at least one of a bounce or a grind for the golf club.

2. The method of claim 1, wherein the first shot type is one of a full swing, a greenside, or an open-face shot.

3. The method of claim 1, wherein the generating the fitting recommendation comprises generating a plurality of potential bounces for the golf club and ranking the plurality of potential bounces.

4. The method of claim 1, further comprising receiving, by the computing device from the launch monitor, second swing analytics for at least one golf shot of a second shot type,
   wherein the fitting recommendation is based on both the first swing analytics and the second swing analytics.

5. The method of claim 1, wherein the player input data comprises at least one of fairway conditions, bunker conditions, player handicap, player pitching wedge loft, player highest preferred loft, or player bunker confidence.

6. The method of claim 1, wherein the first swing analytics comprises at least one of an attack angle or a shaft lean.

7. The method of claim 1, wherein the fitting recommendation comprises both the bounce and the grind for the golf club.

8. A computer-implemented method for generating a fitting recommendation for a golf club, the method comprising:
   displaying, by a computing device, a first user interface comprising input fields;
   receiving, as input into the input fields of the first user interface, player input data;
   receiving, by the computing device from a launch monitor communicatively coupled to the computing device, first swing analytics for a first golf shot;
   displaying, by the computing device, a second user interface comprising a graphical technique representation with a shot indicator representing the first swing analytics of the first golf shot;
   generating, by the computing device, the fitting recommendation based on the player input data and the first swing analytics, the fitting recommendation comprising at least one of a bounce or a grind for the golf club; and
   displaying, by the computing device, the fitting recommendation.

9. The method of claim 8, further comprising:
   receiving, by the computing device from the launch monitor, second swing analytics for a second golf shot, the second swing analytics comprising at least one of an attack angle or a shaft lean; and updating the shot indicator based on the second swing analytics.

10. The method of claim 8, further comprising receiving, by the computing device from the launch monitor, second swing analytics for a second golf shot, the second swing analytics comprising at least one of an attack angle or a shaft lean, wherein the fitting recommendation is further based on the second swing analytics.

11. The method of claim 8, further comprising:

generating, by the computing device and based on the player input data, a golf shot prompt comprising a plurality of golf clubs, a corresponding loft of each golf club of the plurality of golf clubs, and at least one shot type for each golf club of the plurality of golf clubs, and receiving, by the computing device from the launch monitor, swing analytics for a plurality of golf shots based on the golf shot prompt, the swing analytics comprising at least one of an attack angle or a shaft lean for each golf shot of the plurality of golf shots.

12. The method of claim 8, wherein the second user interface further comprises a fitting recommendation representation to display a loft of the golf club and a recommended bounce of the fitting recommendation for the golf club.

13. The method of claim 8, wherein the generating the fitting recommendation comprises generating a plurality of potential bounces for the golf club and ranking the plurality of potential bounces.

14. The method of claim 13, wherein the second user interface comprises a selectable user interface element and the method further comprises:

receiving a selection of the selectable user interface element; and in response to receiving the selection, displaying a third user interface comprising a loft of the golf club and the plurality of potential bounces for the golf club.

15. The method of claim 8, wherein the first swing analytics comprises at least one of an attack angle or a shaft lean, and wherein the graphical technique representation comprises a technique graph having a first axis corresponding to the attack angle and a second axis corresponding to the shaft lean, and the shot indicator is displayed in the technique graph.

16. The method of claim 15, wherein the first golf shot is of a first shot type, and wherein the method further comprises:

receiving, by the computing device from the launch monitor, second swing analytics for a second golf shot of the first shot type, the second swing analytics comprising at least one of an attack angle or a shaft lean; and based on the second swing analytics of the second golf shot, updating the shot indicator by moving the shot indicator to a point in the technique graph having an attack angle corresponding to an average of the attack angles of the first and second golf shots and having a shaft lean corresponding to an average of the shaft leans of the first and second golf shots.

17. The method of claim 16, wherein the shot indicator comprises a geometric shape, and wherein updating the shot indicator comprises decreasing a size of the geometric shape.

18. A system for generating a fitting recommendation for a golf club, the system comprising:

a launch monitor comprising one or more sensors configured to capture at least one of swing analytics or ball flight characteristics; and a computing device communicatively coupled to the launch monitor, the computing device comprising:
a display,
a processor, and
memory storing instructions that, when executed by the processor, cause the system to perform operations comprising:
receiving, by the computing device from the launch monitor, first swing analytics for a first golf shot;
displaying, on the display, a shot-analysis user interface comprising a graphical technique representation representing the first swing analytics of the first golf shot; and
generating the fitting recommendation based on the first swing analytics, the fitting recommendation comprising at least one of a bounce or a grind for the golf club.

19. The system of claim 18, wherein the first swing analytics comprises at least one of an attack angle or a shaft lean, and wherein the graphical technique representation comprises:
a technique graph having a first axis corresponding to the attack angle and a second axis corresponding to the shaft lean; and
a shot indicator in the technique graph representing, in response to the computing device receiving the first swing analytics, the attack angle and the shaft lean of the first golf shot.

20. The system of claim 19, wherein the operations further comprise:

receiving, by the computing device from the launch monitor, second swing analytics for a second golf shot, the second swing analytics comprising at least one of an attack angle or a shaft lean, and updating, in response to receiving the second swing analytics, a position of the shot indicator in the technique graph.

21. The system of claim 18, wherein the operations further comprise:

displaying, on the display, a data-input user interface comprising input fields; and receiving, as input into the input fields of the data-input user interface, player input data, wherein the generating the fitting recommendation is further based on the player input data.

* * * * *